United States Patent
Griffin et al.

(10) Patent No.: US 12,316,615 B1
(45) Date of Patent: May 27, 2025

(54) SYSTEMS AND METHODS FOR THIRD PARTY DATA PROTECTION

(71) Applicant: Wells Fargo Bank, N.A., San Francisco, CA (US)

(72) Inventors: Phillip H. Griffin, Raleigh, NC (US); Brian L. Keltner, Norwalk, IA (US); Ronnie F. McGinnis, Jr., Rock Hill, SC (US); Jeffrey J. Stapleton, O'Fallon, MO (US); Luis A. Suarez, Bolivia, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 595 days.

(21) Appl. No.: 17/552,509

(22) Filed: Dec. 16, 2021

Related U.S. Application Data

(63) Continuation of application No. 16/426,890, filed on May 30, 2019, now Pat. No. 11,212,264.

(51) Int. Cl.
*H04L 29/06* (2006.01)
*H04L 9/08* (2006.01)
*H04L 9/40* (2022.01)

(52) U.S. Cl.
CPC ........ *H04L 63/0435* (2013.01); *H04L 9/0822* (2013.01); *H04L 9/0841* (2013.01); *H04L 9/0861* (2013.01)

(58) Field of Classification Search
CPC . H04L 63/0435; H04L 9/0822; H04L 9/0841; H04L 9/0861
See application file for complete search history.

(56) References Cited

U.S. PATENT DOCUMENTS

| | | | |
|---|---|---|---|
| 7,587,749 B2 * | 9/2009 | Leser | H04L 9/0891 709/229 |
| 9,735,962 B1 * | 8/2017 | Yang | H04L 9/0877 |
| 10,318,762 B1 * | 6/2019 | Buckingham | H04L 9/0643 |
| 2002/0138442 A1 | 9/2002 | Hori et al. | |
| 2004/0151308 A1 | 8/2004 | Kacker et al. | |
| 2005/0144478 A1 | 6/2005 | Yamanaka et al. | |

(Continued)

OTHER PUBLICATIONS

Griffin et al., "Signcryption for Biometric Security", 2017, The Cybersecurity and Information Systems Information Analysis Center (CSIAC), Jul. 14, 2017, p. 1-9 (Year: 2017).*

(Continued)

*Primary Examiner* — Harunur Rashid
(74) *Attorney, Agent, or Firm* — Foley & Lardner LLP

(57) ABSTRACT

Systems and methods for protecting user data received by, stored on, and/or requested by third-party computing devices include a data entry computing system on a first network node. A data entry computing system can include a processing circuit that can identify user-entered data as sensitive user data, generate a content encryption key (CEK), generate encrypted user data by encrypting the sensitive user data with the CEK, tag the encrypted user data and the CEK with a tag readable by a database server on a network node different than the data entry computing system, the tag comprising information indicative of the encrypted user data, and transmit the encrypted user data to the database server, wherein the database server excludes a private key of a key manager on a network node different than the data entry computing system.

18 Claims, 14 Drawing Sheets

(56) References Cited

U.S. PATENT DOCUMENTS

| | | |
|---|---|---|
| 2007/0061835 A1 | 3/2007 | Klein et al. |
| 2007/0079381 A1 | 4/2007 | Hartung et al. |
| 2015/0003614 A1 | 1/2015 | Cocchi et al. |
| 2015/0270957 A1 | 9/2015 | Uzun |
| 2015/0295908 A1 | 10/2015 | O'Hare et al. |
| 2016/0154963 A1 | 6/2016 | Kumar et al. |
| 2018/0048464 A1 | 2/2018 | Lim et al. |
| 2019/0253249 A1 | 8/2019 | Meng |
| 2019/0319784 A1 | 10/2019 | Datye et al. |

OTHER PUBLICATIONS

Qin et al., "A Survey of Proxy Re-Encryption for Secure Data Sharing in Cloud Computing", Journal of Latex Class Files, vol. 13 No. 9, Sep. 2014. 18 pages.

Tysowski et al., "Re-Encryption-Based Key Management Towards Secure and Scalable Mobile Applications in Clouds", 10 pages.

* cited by examiner

SYSTEMS AND METHODS FOR THIRD PARTY DATA PROTECTION

CROSS-REFERENCE TO RELATED PATENT APPLICATIONS

This application is a continuation of U.S. patent application Ser. No. 16/426,890, filed May 30, 2019, entitled "SYSTEMS AND METHODS FOR THIRD-PARTY DATA PROTECTION," the contents of such application being hereby incorporated by reference in its entirety and for all purposes as if completely and fully set forth herein.

TECHNICAL FIELD

The present application relates generally to systems and methods for protecting data received, stored, and/or requested by a third-party. The third-party may include a cloud-based data storage provider.

BACKGROUND

Sensitive user data may be entered by a user via a data entry system and saved to a secure data archive for later retrieval and/or use. In order to maintain security of the sensitive user data in a typical implementation, the sensitive user data is sent from a data entry system to the secure data archive over a secure connection, such as a TLS connection. The secure data archive encrypts the sensitive user data and then stores the sensitive user data to its memory. In response to a data request from a data exit entity, the secure data archive decrypts the sensitive user data and then transmits the decrypted sensitive user data to the data exit system over a secure connection, such as a TLS connection.

One vulnerability of this approach to storage and retrieval of sensitive user data is that cleartext sensitive user data is visible at the start of the secure connection when the sensitive user data is sent to the secure data archive over the secure connection. Similarly, the cleartext sensitive user data is visible at the end of the secure connection when the sensitive user data is sent to the data exit system over the secure connection. Another vulnerability is that the same entity (e.g., the secure data archive) both encrypts the sensitive user data and stores the sensitive user data. Accordingly, if an unauthorized party compromises the secure data archive, the unauthorized party can use the encryption keys stored within the secure data archive to decrypt the sensitive user data. Yet another vulnerability is that the administrators of the secure data archive might not be authorized to access the sensitive user data.

SUMMARY

A first arrangement relates to a data entry computing system on a first network node. The data entry computing system can include a processing circuit that can identify user-entered data as sensitive user data, generate a content encryption key (CEK), generate encrypted user data by encrypting the sensitive user data with the CEK, tag the encrypted user data and the CEK with a tag readable by a database server on a network node different than the data entry computing system, the tag including information indicative of the encrypted user data, and transmit the encrypted user data to the database server, where the database server excludes a private key of a key manager on a network node different than the data entry computing system.

A second arrangement relates to a data storage and translation computing system with a key manager including a processing circuit and a memory storing a public/private key pair and a public key of the data exit entity. The processing circuit can receive a first encrypted content encryption key (CEK) and information indicative of a requestor identity of a requestor, identify a public key of the requestor based on the information indicative of the requestor identity, recover a CEK by decrypting the first encrypted CEK using a private key of the key manager, generate a second encrypted CEK that is decryptable by the requestor by encrypting the CEK using the public key of the requestor, and transmit the second encrypted CEK to a database server, the database server being configured to receive encrypted user data and the first encrypted CEK from a data entry entity, restricted from the private key of the key manager, and restricted from decrypting the encrypted user data.

DETAILED DESCRIPTION

Figure 1:
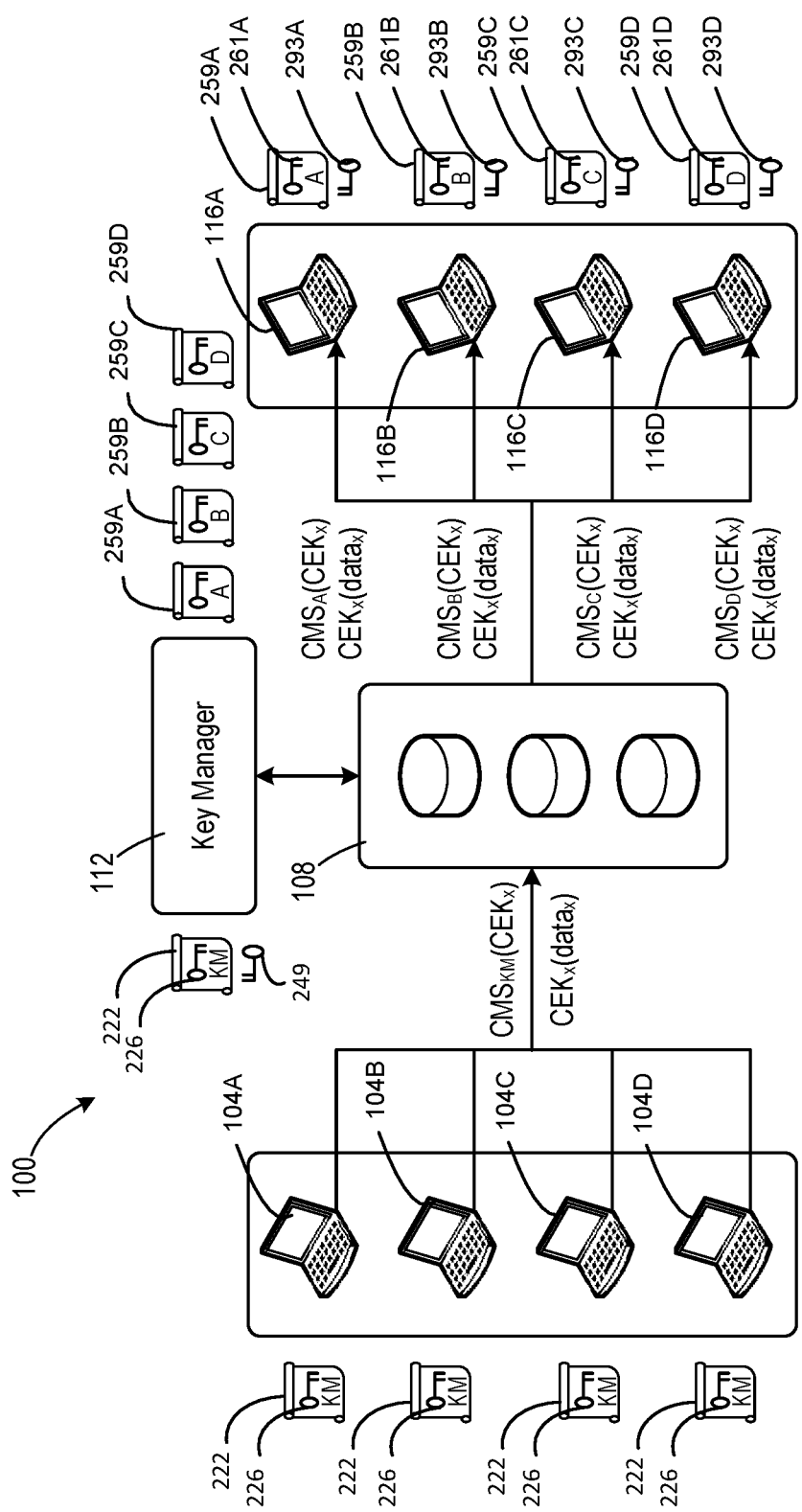
FIG. 1 is a block diagram illustrating an environmental view of a system for protecting user data received by, stored on, and requested by one or more third-party computing systems according to some arrangements.

Referring to the figures generally, various systems, methods, and apparatuses for protecting sensitive user data that is received by, stored on, displayed by and/or used by one or more third-party computing systems. As used herein, the phrase "third-party computing system" refers to a computing system that is not managed by a data owner (e.g., a user providing sensitive user data) or a data receiver (e.g., a user requesting the sensitive user data). Accordingly, the third-party computing system can include a data entry entity that receives the sensitive user data, a database server that stores the sensitive user data, and an exit entity (e.g., requestor) that requests and displays and/or uses the sensitive user data. In some arrangements, a system for protecting sensitive user data received by, stored on, requested by, displayed by, and/or used by one or more third-party computing systems can include a data entry entity, a database server, a key manager, and a requestor or data exit entity. In some arrangements, the data entry entity, the database server, the key manager, and the data exit entity can all be separate entities on separate network nodes. In some arrangements, at least two of the data entry entity, the database server, the key manager, and the data exit entity be on the same network node. For example, in some arrangements, the data entry entity is on a first network node, the database server and the key manager are on a second network node, and the data exit entity is on a third network node. While the disclosure describes the following system and method in the context of sensitive user data, in some arrangements, the following system and method may be used to protect all user data input by the user into the data entry entity.

In some arrangements, the data entry entity includes a public key of the key manager and a processing circuit. The processing circuit includes a data receiving circuit configured to receive user data and a data encryption circuit. The data encryption circuit is configured to generate a content encryption key (CEK). The CEK is a symmetric key that, in some arrangements, can be established using another symmetric key. In some arrangements, the CEK can be established using a public key cryptography (PKC) protocol, such as a Diffie-Hellman protocol or an Elliptic Curve Diffie-Hellman protocol. The data encryption circuit is configured to generate encrypted user data by encrypting the user data with the CEK, generate an encrypted CEK by encrypting the CEK with the public key of the key manager, and tag the encrypted user data and the first encrypted CEK with a tag readable by a database server without the database server having the capability to decrypt any of the encrypted user data. In some arrangements, the tag is a cleartext tag. The tag includes information indicative of the encrypted user data and can be read by the database server. The information indicative of the user data can include a type of user data and/or an identity of a user corresponding to the user data. In some arrangements, the data entry entity is configured to transmit the encrypted user data and the encrypted CEK to the database server over a secure connection. Since the encrypted user data and the encrypted CEK are both encrypted by the data entry entity, no cleartext sensitive user data is exposed at the beginning of the secure connection.

In some arrangements, the data encryption circuit is configured to undergo a key encryption key (KEK) protocol with the key manager to generate a KEK. The data encryption circuit is configured to save the KEK to the key database. In some arrangements, the KEK is a symmetric key. In some arrangements, the KEK is an asymmetric key. For example, the KEK can be a public key of the key manager. The data encryption circuit is configured to encrypt the CEK with the KEK to generate a KEK (CEK). In some arrangements, the CEK can be derived from the KEK based on a message, a unique scheme, a random scheme, and/or a rotational scheme. The cleartext tag is not encrypted with the KEK so that the database server can read the tag. In some arrangements, the KEK is a named Key. In such arrangements, the data encryption circuit is configured to generate a name for the KEK transmit the name of the KEK to the key manager with the KEK (CEK).

In some arrangements, the database server is configured to receive the encrypted user data and the encrypted CEK from the data entry entity. The database server is configured to store the encrypted user data and the encrypted CEK to its memory. The database server includes a processing circuit including a data identification circuit configured to receive a data request message from the data exit entity. The data request message includes information indicative of the requested user data and information indicative of an identity of the data exit entity. The data identification circuit is configured to identify the requested user data and the first encrypted CEK corresponding to the requested user data based on the tag. The data identification circuit is configured to transmit the first encrypted CEK corresponding to the requested user data and the information indicative of the identity of the data exit entity to the key manager. The data identification circuit is configured to receive a second encrypted CEK corresponding to the requested user data. The second encrypted CEK can be decrypted by the data exit entity. The data identification circuit is configured to transmit the encrypted user data and the second encrypted CEK to the data exit entity. The database server excludes the private key of the key manager and cannot decrypt the encrypted user data. As used herein, "excludes" means omits, restricts, segregates, does not generate, does not receive, does not store (e.g., write to non-volatile memory) or does not read to volatile memory. Therefore, an administrator or users of the database server cannot decrypt the encrypted user data. This allows the database server to be administered by an entity that might not be authorized to access the sensitive user data. Furthermore, even if an attacker compromises the database server, the attacker cannot decrypt the encrypted user data.

In some arrangements, the key manager includes a key database and processing circuit including a translation circuit. The key database includes a public/private key pair and certificates corresponding to each data exit entity authorized to request user data. As used herein, the term "public/private key pair" refers to an asymmetric key pair. The private key of any device described herein is not shared or stored outside of the device corresponding to the private key (e.g., the private key never leaves its secured cryptographic boundary). Each of the data exit entity certificates includes a public key of the respective data exit entity. In some arrangements, the key manager is a hardware security module (HSM). In some arrangements, the key manager is communicably and operatively coupled with an HSM. In such arrangements, the key manager may have an onboard HSM that is installed as a cryptocard, the key manager may be physically coupled to the HSM, and/or the key manager may be in communication with the HSM over a network.

The translation circuit is configured to receive the first encrypted CEK and the information indicative of the identity of the data exit entity requesting the encrypted user data, identify the public key of the data exit entity based on the information indicative of the identity of the data exit entity, and recover the cleartext CEK by decrypting the first encrypted CEK using the private key of the key manager. The translation circuit is configured to generate a second CEK that can be decrypted by the data exit entity by encrypting the CEK using the public key of the data exit entity that requested the encrypted user data. The second CEK can be decrypted by the data exit entity using its private key to recover the cleartext CEK. The translation circuit is then configured to transmit the second CEK to the database server. The key manager excludes the encrypted user data. No encrypted user data is sent to the key manager, read into volatile memory on the key manager, or stored on the key manager. Therefore, an administrator of the key manager cannot decrypt the encrypted user data. Furthermore, even if an unauthorized party compromises the key manager, the unauthorized party cannot obtain and/or decrypt the encrypted user data.

In some arrangements, the database server and the key manager are on the same network node. In some arrangements, the key manager, the HSM and the database server can be hosted in the cloud.

In some arrangements, the requestor or data exit entity includes a key database and a processing circuit. The processing circuit includes a data request circuit and a data decryption circuit. The key database includes a public/private key pair and a certificate of the key manager. The certificate of the key manager includes the public key of the key manager. The message generation circuit is configured to receive a user data request input by a user, generate a data request message including information indicative of the requested user data and information indicative of the identity of the database server, and transmit the data request message to the database server. The data decryption circuit is configured to receive the encrypted user data and the second encrypted CEK, recover the cleartext CEK by decrypting the second CEK with the private key of the data exit entity, and recover the sensitive user data by decrypting the encrypted user data with the CEK.

Figure 2:
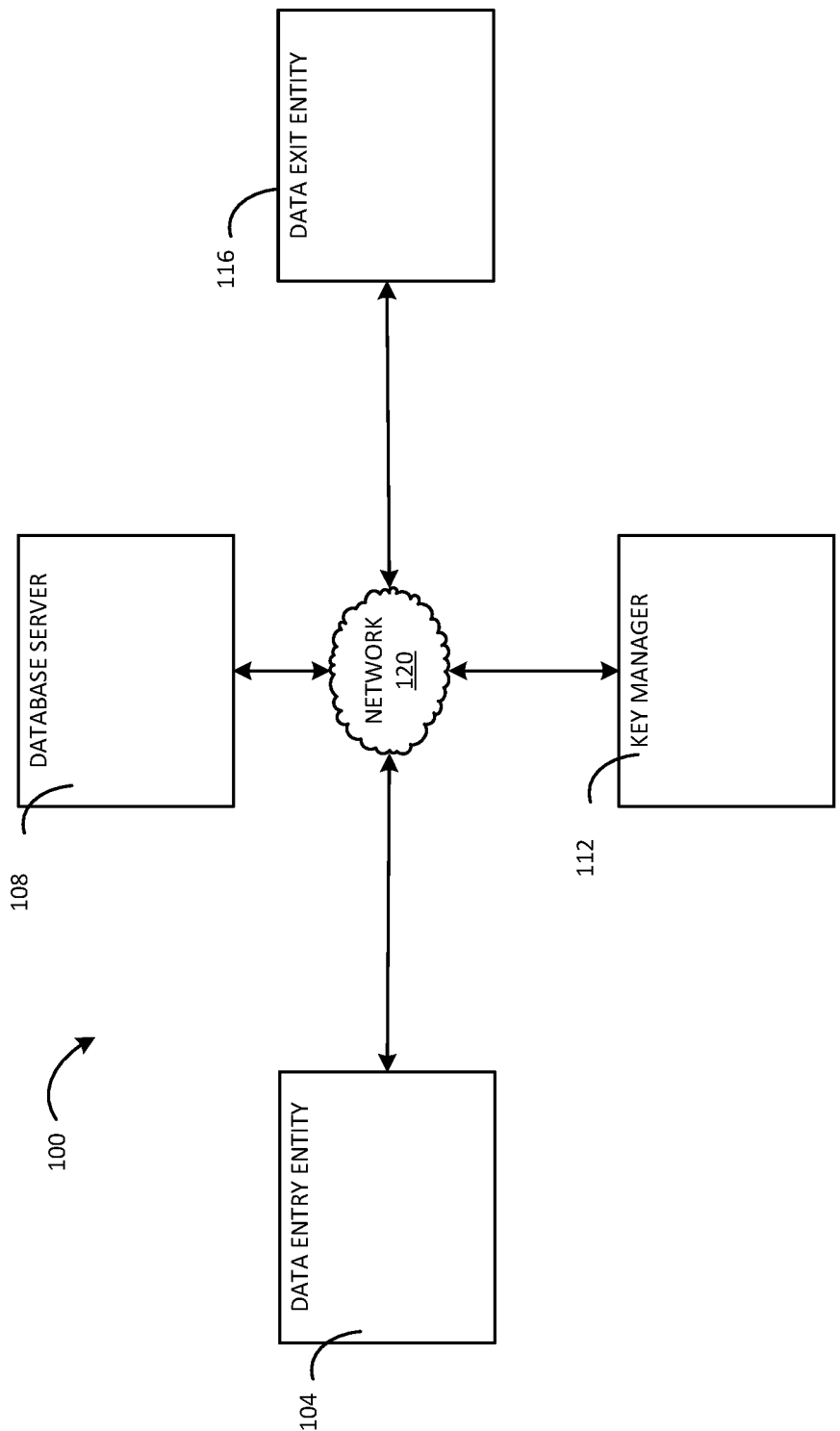
FIG. 2 is a block diagram illustrating another environmental view of the system of FIG. 1 according to some arrangements.

Referring now to FIGS. 1-2, an environmental view of a system 100 for protecting user data that is entered into a third-party data entry device, sent to and stored on a third-party database server, and displayed and/or used by a third-party data exit computing system is shown. As used herein, the phrase "third-party computing system" means a computing system that is not managed by a data owner (e.g., a user providing sensitive user data) or a data receiver (e.g., a user requesting the sensitive user data). The sensitive user data can include identity information such as a social security number, account number, date of birth, biometric data (e.g., a stored image of a fingerprint, retina, or other body part to be used to authenticate the user) and so on. As shown in FIGS. 1-2, the system 100 incudes one or more data entry entities 104, a database server 108, a key manager 112, and one or more requestors or data exit entities 116 connected by a network 120. For example, the system 100 illustrated in FIG. 1 includes four data entry entities 104A-104D and four data exit entities 116A-116D that are in communication with the database server 108 over the network 120. In other arrangements, the system 100 can include a different number of data entry entities 104 and data exit entities 116. While the data entry entity 104, the database server 108, the key manager 112, and the data exit entity 116 are shown as being on separate network nodes in FIGS. 1-2, in some arrangements, the database server 108 and the key manager 112 can be on the same network node.

Figure 2B:
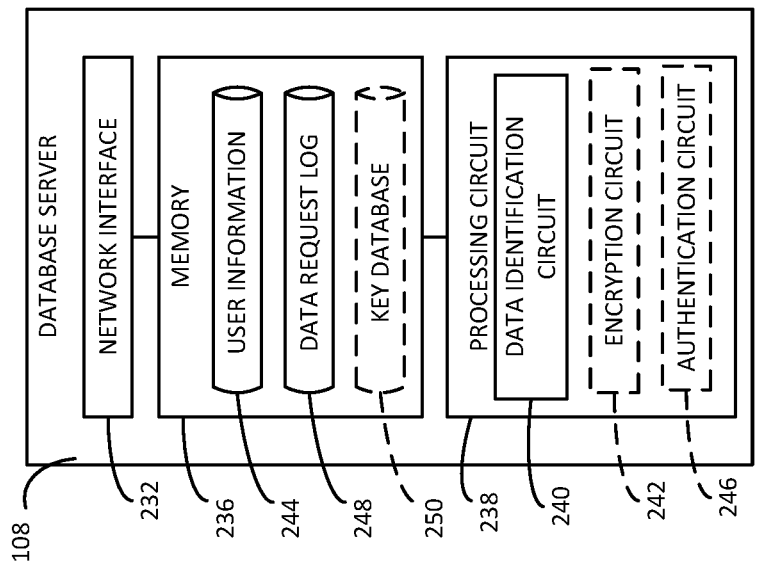
FIG. 2B is a block diagram illustrating an environmental view of a database server of FIG. 2 according to some arrangements.
Figure 2A:
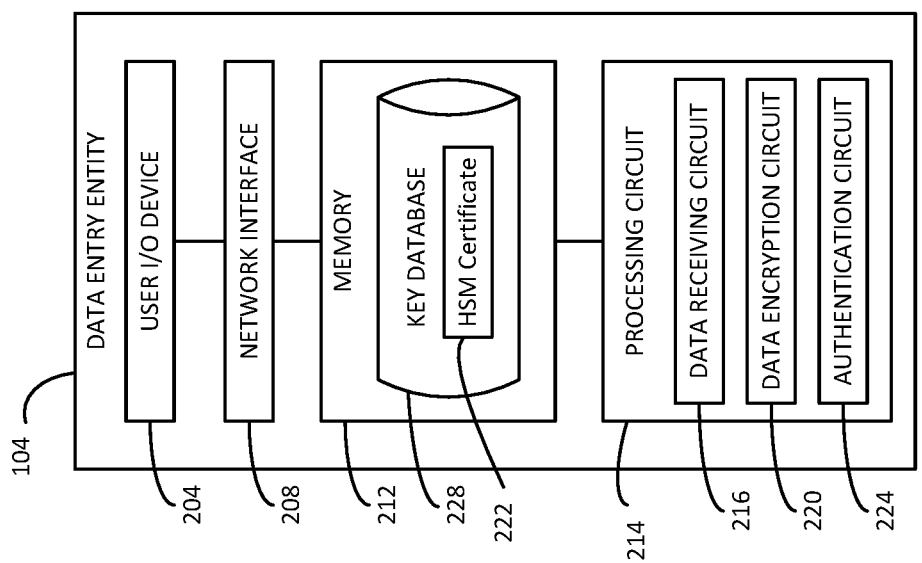
FIG. 2A is a block diagram illustrating an environmental view of a data entry entity of FIG. 2 according to some arrangements.

The data entry entity 104 is a computing system that includes a software program that requests that a user enter sensitive user data to be stored by the database server 108. The data entry entity 104 may be administered by a third-party. The data entry entity 104 can include a web browser that includes a software application that requests that the user enter sensitive user data to be stored by the third-party data storage system 100. In other arrangements, the data entry entity 104 can include a local software application that requests that the user enter sensitive data to be stored by the third-party data storage system 100. In some arrangements, the data entry entity 104 is on a single network node. As shown in FIG. 2A, in the illustrated arrangement, the data entry entity 104 includes a user input/output device 204, a network interface 208, a memory 212, and a processing circuit 214. The processing circuit 214 includes a data receiving circuit 216, a data encryption circuit 220, and an authentication circuit 224. The user input/output device 204 can include an input device or component of the user input/output device 204 that allows the user to provide information to the data entry entity 104, and may include, for example, a mechanical keyboard, a touchscreen, a microphone, a camera, a fingerprint scanner, any user input device that is configured to be engaged with the data entry entity 104 via a USB, serial cable, Ethernet cable, and so on. An output device or component of the user input/output device 204 allows the user to receive information from the data entry entity 104, and may include, for example, a digital display, a speaker, illuminating icons, LEDs, and so on.

The network interface 208 of the data entry entity 104 is adapted for and configured to establish a communication session via the network 120 with the other components of the system 100. As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver). As shown in FIG. 2A, the memory 212 is communicably and operatively coupled with the other components of the data entry entity 104. The memory 212 includes a key database 228. The key database 228 is configured to retrievably store a certificate 222 of the key manager 112 that includes a public key 226 of the key manager 112. In some arrangements, the certificates described herein can be X.509 certificates.

The data receiving circuit 216 is configured to prompt or request the user to enter user data. For example, the data receiving circuit 216 can display the prompts or requests on a screen of the user input/output device 204, generate audio inputs, etc. using one or more output devices of the output component of the user input/output device 204. The prompts or requests displayed on a screen can have text entry inputs for receiving data entered by the user. The text entry inputs that are configured to receive sensitive user data can be tagged to indicate that the data entered by the user is sensitive user data. In arrangements in which the prompt or request is audio, the question can include a tag indicating that user data received in response to the prompt or request is sensitive user data.

The data encryption circuit 220 is configured to recognize one or more pieces of the user data as being sensitive user data. In some arrangements, data entry interfaces (e.g., data entry windows on a website application or a software program) can be tagged as sensitive data entry windows that receive sensitive user data, as described above. The data encryption circuit 220 is configured to generate a content encryption key (CEK) in response to determining that user data is sensitive user data. The CEK is a symmetric key. The data encryption circuit 220 is configured to generate a different CEK for each piece of sensitive user data input by the user. The data encryption circuit 220 is configured to generate encrypted user data by encrypting the sensitive user data with the CEK. The data encryption circuit 220 is configured to generate an encrypted CEK by encrypting the CEK with the public key 226 of the key manager 112. For example, the data encryption circuit 220 can encrypt the CEK using CMS-envelope data with public key 226 of the key manager 112 from the key manager certificate 222. Encrypting the sensitive user data with the CEK and encrypting the CEK with the public key 226 of the key manager 112 increases the speed of the encryption process since encryption with symmetric keys is faster than encryption with asymmetric keys. Since the CEK is encrypted using the public key 226 of the key manager 112, access to the encrypted user data still is protected by the strength of asymmetric encryption.

In some arrangements, the data encryption circuit 220 is configured to generate a CMS SignedData message wrapper around the encrypted user data and the encrypted CEK, which can provide the functionality of nested SignedData (EnvelopedData) messages. In such an arrangement, the key database 228 includes a public/private key pair of the data entry entity 104 and a certificate of the database server 108. The certificate of the database server 108 includes a public key of the database server 108. Such arrangements do not require a secure connection, such as the secure tunnel provided by TLS.

In some arrangements, the data encryption circuit 220 is configured to generate a CMS SigncryptedData message wrapper around the encrypted user data and the encrypted CEK, which can provide the functionality of nested SignedData (EnvelopedData) messages. In such an arrangement, the key database 228 includes a public/private key pair of the data entry entity 104 and a certificate of the database server 108. The certificate of the database server 108 includes a public key of the database server 108. Such arrangements do not require a secure connection, such as the secure tunnel provided by TLS.

In some arrangements, the data encryption circuit 220 is configured to undergo a key encryption key (KEK) protocol with the key manager 112 to generate a KEK with the key manager 112. The data encryption circuit 220 is configured to save the KEK to the key database 228. In some arrangements, the data encryption circuit 220 uses the same KEK for all of the CEKs that can be translated by the key manager 112. In some arrangements, the KEK is a symmetric key. In some arrangements, the KEK is an asymmetric key. For example, the KEK can be the public key 226 of the key manager 112. The data encryption circuit 220 is configured to encrypt the CEK with the KEK to generate a KEK (CEK). In such arrangements, the cleartext tag is not encrypted with the KEK so that the database server 108 can read the tag. In some arrangements, the CEK can be derived from the KEK based on a message, a unique scheme, a random scheme, and/or a rotational scheme. In some arrangements, the KEK is a named Key. In such arrangements, the data encryption circuit 220 is configured to generate a name for the KEK and transit the name of the KEK to the key manager with the KEK (CEK).

The data encryption circuit 220 is configured to tag both the encrypted user data and the encrypted CEK with a tag that is readable by the database server 108. The tag can include information indicative of the encrypted user data. The information indicative of the encrypted user data can include information indicative of a type of user data (e.g., social security number, account number, address, birth date, biometric, etc.) and/or information indicative of an identity of the user (e.g., a name, a reference number, etc.). In some arrangements, the data encryption circuit 220 is configured to transmit the encrypted user data and the encrypted CEK to the database server 108 over a secure connection. Since the encrypted user data and the encrypted CEK are sent over the secure connection, the cleartext sensitive user data and the cleartext CEK are not visible at the entrance and exit of the secure connection. In some arrangements, the secure connection can be a TLS connection. The data encryption circuit 220 is configured to destroy the CEK and the user data in response to receiving a message from the database server 108 indicating that the encrypted user data and the encrypted CEK have been received by the database server 108. In arrangements which the encrypted user data and the encrypted CEK are wrapped with a CMS SignedData message wrapper or in which the encrypted user data and the encrypted CEK are wrapped with a CMS SigncryptedData message wrapper, the encrypted user data and the encrypted CEK do not need to be transmitted over a secure connection.

In some arrangements, the data encryption circuit 220 can receive more than one piece of sensitive user data. When more than one piece of sensitive user data is received, the data encryption circuit 220 is configured to generate a new CEK for each piece of sensitive user data as described above. The data encryption circuit 220 is configured to generate encrypted user data from each piece of sensitive user data by encrypting each piece of sensitive user data with the CEK generated for that piece of sensitive user data. The data encryption circuit 220 is configured to generate a tag for each piece of encrypted user data and each CEK corresponding to each piece of encrypted user data as described above.

The authentication circuit 224 is configured to validate the key manager certificate 222 that is stored in the key database 228. For example, the authentication circuit 224 can transmit the key manager certificate 222 to the certificate authority that issued the key manager certificate 222 and ask the certificate authority to confirm that the key manager certificate 222 is valid. In some arrangements, the authentication circuit 224 validates the key manager certificate 222 every time encrypted user data and an encrypted CEK is sent to the database server 108. In some arrangements, the authentication circuit 224 validates the key manager certificate 222 based on a predefined time period (e.g., hourly). In some arrangements, the authentication circuit 224 validates the key manager certificate 222 every time user data is received by the data receiving circuit 216. The authentication circuit 224 is configured to prevent users from entering sensitive user data in response to determining that the key manager certificate 222 is expired or has been revoked. Accordingly, only data entry entities 104 having valid key manager certificates 222 can receive the encrypted user data. The authentication circuit 224 is configured to read an expiration date of the key manager certificate 222 from the key manager certificate 222. The authentication circuit 224 is configured to notify an administrator of the data entry entity 104 in response to determining that the key manager certificate 222 will expire in less than a predefined time period. In some arrangements, the predefined time period may be ninety days. In arrangements in which the data encryption circuit 220 is configured to generate a CMS signed Data message wrapper around the encrypted user data or the data encryption circuit 220 is configured to generate a CMS SigncryptedData message wrapper around the encrypted user data and the encrypted CEK, the authentication circuit 224 is configured to validate the certificate of the database server 108 as described above with respect to the key manager certificate 222.

The database server 108 is a secure computing system that is configured to store encrypted user data received from one or more data entry entities 104 connected to the network 120. The database server 108 may be administered by a third-party. In some arrangements, the database server 108 is hosted in the cloud. As shown in FIG. 2B, the database server 108 includes a network interface 232, a memory 236, and a processing circuit 238. The processing circuit 238 includes a data identification circuit 240. The network interface 232 is configured to establish a communication session via the network 120. The memory 236 is communicably and operatively coupled with the other components of the database server 108. The memory 236 includes a user information database 244 and a data request log 248. The user information database 244 includes encrypted user data and encrypted CEKs that correspond to the encrypted user data. The data request log 248 includes list of information indicative of the encrypted user data requested by the data exit entity 116 and information indicative of the identity of the data exit entity 116. The memory 236 excludes the certificate 222 of the key manager 112. The memory 236 excludes a private key 249 of the key manager 112. The certificate 222 of the key manager 112 and/or the private key 249 of the key manager 112 are not stored to the memory 236. Accordingly, the database server 108 and/or the administrators of the database server 108 cannot decrypt the encrypted CEKs corresponding to the encrypted user data. The database server 108 and/or the administrators of the database server 108 therefore cannot decrypt the encrypted user data to access cleartext sensitive user data. Furthermore, unauthorized parties cannot access the sensitive user data even if the unauthorized parties gain access to the database server 108. Stated another way, the database server 108 does not have access to the private keys 249 stored in the key manager 112, cleartext CEKs, and cleartext sensitive user data. This allows the database server 108 to be administered by an entity that might not be authorized to access the sensitive user data.

The database server 108 is configured to receive the encrypted user data and the encrypted CEK corresponding to the encrypted user data from the data entry entity 104. Stated another way, the data entry entity 104 transmits encrypted data, rather than cleartext data, to the database server 108. Furthermore, cleartext sensitive user data and the cleartext CEK are not available to the database server 108. The database server 108 is configured to save the encrypted user data and the encrypted CEK to the user information database 244 in the memory 236. The database server 108 is configured to transmit a message to the data entry entity 104 to confirm that the encrypted user data and the encrypted CEK have been received.

The data identification circuit 240 is configured to receive a data request message from the data exit entity 116. The data request message can include information indicative of the requested user data and information indicative of an identity of the data exit entity 116. The information indicative of the requested user data can include information indicative of an identity of the user corresponding to the encrypted user data, information indicative of a type of encrypted user data, etc. The information indicative of the identity of the data exit entity 116 can include an IP address of the data exit entity 116, an IMEI number of the data exit entity 116, an instance of a software application running on the data exit entity 116, etc. The data identification circuit 240 is configured to identify the encrypted user data requested by the data exit entity 116 based on the tag. For example, the data identification circuit 240 can read the information indicative of the requested user data from the data request message and compare the information indicative of the requested user data to the information indicative of the encrypted user data in each of the tags to identify a match. During this process, the data identification circuit 240 does not decrypt the encrypted user data. As mentioned above, the tags are cleartext so that the data identification circuit 240 can read the tags. The data identification circuit 240 is configured to retrieve the encrypted CEK corresponding to the requested user data. The data identification circuit 240 is configured to transmit the encrypted CEK corresponding to requested user data and the information indicative of the identity of the data exit entity 116 to the key manager 112. The data identification circuit 240 is configured to log information indicative of each piece of user data requested and the data exit entity 116 or data exit entities 116 requesting each piece of user data in the data request log 248 stored in the memory 236. In some arrangements, the information indicative of each piece of user data requested can include one or more pieces indicative of the encrypted user data that is included in the tag.

In some arrangements, the data identification circuit 240 is configured to receive a second encrypted CEK and the information indicative of the identity of the data exit entity 116 from the key manager 112. The second encrypted CEK can be decrypted by the data exit entity 116 to recover the cleartext CEK, but the second encrypted CEK cannot be decrypted by the database server 108. The second encrypted CEK includes the tag readable by the database server 108. The data identification circuit 240 is configured to retrieve the encrypted user data including the same tag as the second encrypted CEK. The data identification circuit 240 is configured to transmit the encrypted user data and the second CEK to the data exit entity 116. In some arrangements, the data identification circuit 240 is configured to transmit the encrypted user data and the second encrypted CEK to the data exit entity 116 over a secure connection. Since the encrypted user data and the second encrypted CEK are both encrypted, no cleartext sensitive user data is present at the entrance or exit of the secure connection. The data identification circuit 240 handles second, third, etc. data request messages from the data exit entity 116 or other data exit entities 116 as described above.

In some arrangements, the data identification circuit 240 is configured to transmit one or more pieces of encrypted user data to one or more of the data exit entities 116 according to a predefined schedule. In such arrangements, the data exit entity 116 is configured to send a message to the database server 108 that establishes the predefined schedule and an identity of one or more data entry entities 104, information indicative of one or more types of encrypted user data, and/or one pieces of information indicative of an identity of a user to send to the data exit entity 116 according to the predefined schedule. In some arrangements, the data exit entity 116 may send this message to the database server 108 as metadata when the data exit entity 116 sends its certificate 259 to the database server 108. In other arrangements, the data exit entity 116 may send this message to the database server 108 separately from the certificate 259. The data identification circuit 240 is configured to identify the encrypted user data based on the tag and send the encrypted CEK corresponding to the encrypted user data to the key manager 112 as described above.

In some arrangements, the data entry entity 104 is configured to transmit instructions that include information indicative of one or more data exit entities 116 and that command the database server 108 to send the encrypted user data to one or more data exit entities 116. In some arrangements, the instructions are included in the tag. In other arrangements, the instructions are sent with the encrypted user data in another manner, such as a message wrapper such as a CMS SignedData message wrapper or a CMS SigncryptedData message wrapper. The data identification circuit 240 is configured to identify the instructions sent with the encrypted user data and send the encrypted CEK corresponding to the encrypted user data and the information indicative of the one or more data exit entities 116 to the key manager 112 as described above.

In arrangements in which the database server 108 is configured to send and/or receive messages that include CMS SignedData message wrappers or CMS SincryptedData message wrappers, the database server 108 further includes an encryption circuit 242 and an authentication circuit 246. The memory 236 of the database server 108 includes a key database 250 including a public/private key pair of the database server 108, a certificate (not shown) of each of the one or more data entry entities 104, and a certificate 259 of each of the one or more the data exit entities 116. The certificate of the data entry entity 104 includes a public key (not shown) of the data entry entity 104. The certificate 259 of the data exit entity 116 includes a public key 261 of the data exit entity 116. The authentication circuit 246 is similar to the authentication circuit 224 described above with respect to the data entry entity 104 and is configured to validate the certificate of the data entry entity 104 and the certificate 259 of the data exit entity 116 as described above with respect to the key manager certificate 222. However, in response to determining that the certificate of the data entry entity 104 or the certificate 259 of the data exit entity 116 is expired or has been revoked, the authentication circuit 246 is configured to prevent decryption of incoming messages or encryption of outgoing messages using public keys contained in the expired or revoked certificates.

In arrangements in which the encryption circuit 242 is configured to receive incoming messages including CMS SignedData message wrappers, the encryption circuit 242 is configured to verify the digital signature and decrypt the CMS SignedData message wrapper using the public key of the data entry entity 104 and the private key of the database server 108, respectively. In arrangements in which the encryption circuit 242 is configured to send messages including CMS SignedData message wrappers, the encryption circuit 242 is configured to wrap the encrypted user data and the second encrypted CEK with a CMS SignedData message wrapper using the public key 261 of the data exit entity 116 that will receive the message. The encryption circuit 242 is configured to generate a digital signature using the private key of the database server 108. In arrangements in which the encrypted user data and the encrypted CEK are wrapped with a CMS SignedData message wrapper, the encrypted user data and the encrypted CEK do not need to be transmitted over a secure connection.

In arrangements in which the encryption circuit 242 is configured to receive messages including CMS SigncryptedData message wrappers, the encryption circuit 242 is configured to verify the digital signature and decrypt the CMS SignedData message wrapper using the public key of the data entry entity 104 and the private key of the database server 108, respectively. In arrangements in which the encryption circuit 242 is configured to send messages including CMS SigncryptedData message wrappers, the encryption circuit 242 is configured to wrap the encrypted user data and the second encrypted CEK with a CMS SigncryptedData message wrapper using the public key 261 of the data exit entity 116 that will receive the message and the private key of the database server 108. In arrangements in which the encrypted user data and the encrypted CEK are wrapped with a CMS SigncryptedData message wrapper, the encrypted user data and the encrypted CEK do not need to be transmitted over a secure connection.

In some arrangements, the data request message can include one or more pieces of requested user data. In such an arrangement, the data identification circuit 240 can identify each piece of encrypted user data corresponding to each piece of requested user data based on the information indicative of the encrypted user data included in the tags. The data identification circuit 240 can retrieve the encrypted CEKs corresponding to each piece of requested user data and transmit them to the key manager 112 with the information indicative of the identity of the data exit entity 116. In some arrangements, the data request message can include the information indicative of one or more data exit entities 116 and one or more pieces of requested user data. In such arrangements, the data identification circuit 240 can retrieve the one or more CEKs corresponding to the one or more pieces of requested user data and transmit the one or more CEKs and the information indicative of the one or more data exit entities 116 to the key manager 112.

In some arrangements, the data request message can include information indicative of the requested user data and information indicative of an identity of one or more data exit entities 116 requesting the user data. In arrangements in which the data request message indicates that more than one data exit entity 116 is requesting the user data, the data identification circuit 240 is configured to transmit the encrypted CEK corresponding to the requested user data and the information indicative of the identity of the each of the data exit entities 116 requesting the user data to the key manager 112. The data identification circuit 240 is configured to retrieve the second encrypted CEKs from the key manager 112 corresponding to each of the data exit entities 116 based on the information indicative of the identity of each of the data exit entities 116. The data identification circuit 240 is configured to transmit the encrypted user data and the second encrypted CEK corresponding to each respective data exit entity 116 to each of the data exit entities 116. In some arrangements, the data identification circuit 240 transmits the encrypted user data and the second encrypted CEK over a secure connection. Since the encrypted user data and the second encrypted CEK are both encrypted, no cleartext sensitive user data is exposed at the entrance or exit of the secure connection. In arrangements which the encrypted user data and the encrypted CEK are wrapped with a CMS SignedData message wrapper or in which the encrypted user data and the encrypted CEK are wrapped with a CMS SigncryptedData message wrapper, the encrypted user data and the encrypted CEK do not need to be transmitted over a secure connection.

The key manager 112 includes a network interface 252, a memory 256, and a processing circuit 258. In some arrangements, the key manager 112 is a hardware security module (HSM). In some arrangements, the key manager 112 is communicably and operatively coupled with a HSM. In such arrangements, the key manager 112 may have an onboard HSM that is installed as a cryptocard, the key manager 112 may be physically coupled to an HSM, and/or the key manager 112 may be in communication with an HSM over the network 120.

Figure 2D:
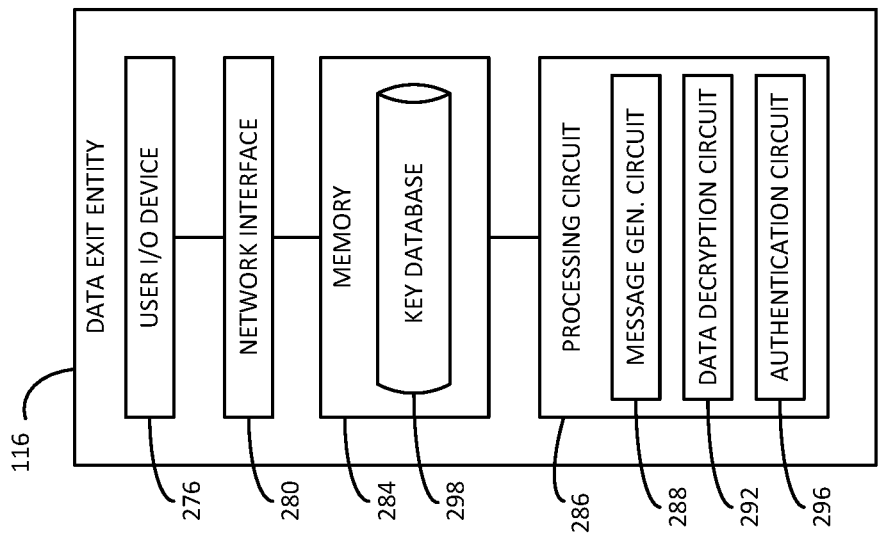
FIG. 2D is a block diagram illustrating an environmental view of a data exit entity of FIG. 2 according to some arrangements.
Figure 2C:
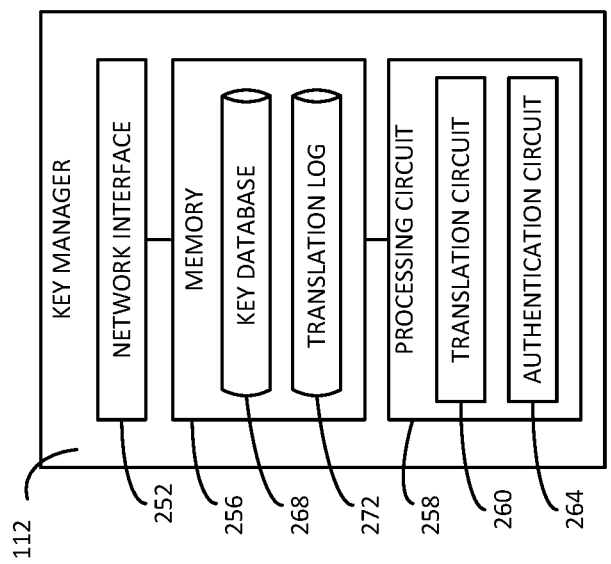
FIG. 2C is a block diagram illustrating an environmental view of a key manager of FIG. 2 according to some arrangements.

The processing circuit 258 includes a translation circuit 260 and an authentication circuit 264. The network interface 252 is configured to establish a communication session via the network 120. As shown in FIG. 2C, the memory 256 is communicably and operatively coupled with the other components of the key manager 112. The memory 256 includes a key database 268 and a CEK translation log 272. The key database 268 includes a public/private key pair of the key manager 112 and a certificate 259 for each data exit entity 116 authorized to receive user data from the database server 108. The certificates 259 include public keys 261 for each of the data exit entities 116 authorized to receive user data from the database server 108. For example, in the arrangement of FIG. 1, the system 100 illustrates a certificate 259A-259D corresponding to each of the data exit entities 116A-116D, respectively. Each of the certificates 259A-259D includes the public key 261A-261D, respectively. Therefore, only data exit entities 116 having valid certificates 259 can receive encrypted user data from the database server 108. The CEK translation log 272 includes a list of the encrypted CEKs translated by the key manager 112 and the data exit entity 116 or data exit entities 116 requesting each translated CEK. The memory 256 excludes the encrypted user data. Furthermore, the encrypted user data is never sent to the key manager 112. Therefore, the encrypted user data is not read into a volatile memory of the key manager 112 and is not stored in the memory 256. Since encrypted user data is not sent to the key manager 112, the key manager 112 cannot decrypt the encrypted user data to recover the cleartext sensitive user data. Since the key manager 112 does not decrypt and then re-encrypt the encrypted user data with the public key 261 of the data exit entity 116, the key manager 112 does not transmit or receive any encrypted user data. Therefore, an administrator of the key manager 112 cannot access the encrypted user data, let alone decrypt the encrypted user data to recover the cleartext sensitive user data. Accordingly, the encrypted user data is managed by a different entity (e.g., the database server 108) than the key manager 112. Furthermore, if an unauthorized party gains access to the key manager 112, the unauthorized party cannot access the encrypted user data let alone decrypt the encrypted user data to recover the cleartext sensitive user data.

The translation circuit 260 is configured to receive the encrypted CEK and the information indicative of the identity of the data exit entity 116 from the database server 108. The translation circuit 260 is configured to recover the cleartext CEK by decrypting the encrypted CEK with the public key 226 of the key manager 112. The translation circuit 260 is configured to retrieve the certificate 259 and/or the public key 261 corresponding to the data exit entity 116 based on the information indicative of the identity of the data exit entity 116. The translation circuit 260 is configured to generate a second encrypted CEK by encrypting the cleartext CEK with the public key 261 of the data exit entity 116 from the certificate 259 corresponding to the data exit entity 116 requesting the encrypted user data. As used herein, the phrase "CEK translation" refers to the process of regenerating the cleartext CEK by decrypting the encrypted CEK with the public key 226 of the key manager 112 and encrypting the cleartext CEK with the public key 261 of the data exit entity 116. The translation circuit 260 is configured to transmit the second encrypted CEK and the information indicative of the identity of the data exit entity 116 to the database server 108.

In some arrangements, the translation circuit 260 can receive one or more encrypted CEKs and information indicative of one or more data exit entities 116. In such arrangements, the translation circuit 260 is configured to retrieve the certificates 259 corresponding to each of the one or more data exit entities 116. The translation circuit 260 is configured to encrypt the one or more cleartext CEKs with the public keys 261 of each of the data exit entities 116 that have requested the encrypted user data corresponding to the one or more CEKs. The translation circuit 260 is configured to log each CEK translation request in the CEK translation log 272. For example, the translation circuit 260 is configured to save a record of each CEK translated and the data exit entity 116 or data exit entities 116 requesting the translation in the CEK translation log 272. In some arrangements, the translation circuit 260 is configured to log CEK translation requests from data exit entities 116 having invalid certificates 259 in the CEK translation log 272.

In arrangements in which KEKs are used to encrypt the CEK, the translation circuit 260 is configured to undergo a KEK generation protocol with the data entry entity 104 to generate a KEK with the data entry entity 104. The translation circuit 260 is configured to save the KEK established with the data entry entity 104 to the key database 250. In arrangements that include one or more data entry entities 104, the translation circuit 260 is configured to generate a KEK with each of the data entry entities 104 and save each of the KEKs to the key database 250. The translation circuit is also configured to undergo a KEK generation protocol with the data exit entity 116 to generate a KEK with the data exit entity 116. The translation circuit 260 is configured to save the KEK established with the data exit entity 116 to the key database 250. In arrangements that include one or more data exit entities 116, the translation circuit 260 is configured to generate a KEK with each of the data exit entities 116 and save each of the KEKs to the key database 250.

In arrangements that include KEKs, the key manager 112 receives the KEK (CEK) encrypted with the public key 226 of the key manager 112. The translation circuit 260 is configured to decrypt the KEK (CEK) using the private key 259 of the key manager 112. The translation circuit 260 is configured to recover the cleartext CEK by decrypting the KEK (CEK) using the KEK corresponding to the data entry entity 104 that generated the CEK. The translation circuit 260 then retrieves the KEK corresponding to the data exit entity 116 requesting the encrypted user data based on the information indicative of the identity of the data exit entity 116. The translation circuit 260 encrypts the cleartext CEK with the KEK generated with the data exit entity 116 requesting the encrypted user data to generate a second KEK (CEK). The translation circuit 260 then encrypts the second KEK (CEK) with the public key 261 of the data exit entity 116 requesting the encrypted user data to generate the second encrypted CEK.

The authentication circuit 264 is configured to validate the one or more data exit entity certificates 259 stored in the key database 268. For example, the authentication circuit 264 can transmit the one or more data exit entity certificates 259 to the certificate authority that issued each of the one or more data exit entity certificates 259 and ask the certificate authority to confirm that each of the one or more data exit entity certificates 259 is valid. In some arrangements, the authentication circuit 264 validates the certificate of a particular data exit entity 116 every time the data exit entity 116 requests translation of one or more encrypted CEKs. In some arrangements, the authentication circuit 264 validates the one or more data exit entity certificates 259 based on a predefined time period (e.g., hourly). The authentication circuit 264 is configured to prevent translation of the cleartext CEK in response to determining that the data exit entity certificate 259 of the data exit entity 116 requesting the encrypted user data is expired or has been revoked. The authentication circuit 264 is configured to read an expiration date of the one or more data exit entity certificates 259. Accordingly, only data exit entities 116 having valid certificates 259 can receive encrypted user data and the encrypted second CEK corresponding to the encrypted user data from the database server 108. The authentication circuit 264 is configured to notify an administrator of the key manager 112 in response to determining that one or more of the data exit entity certificates 259 will expire in less than a predefined time period. In some arrangements, the predefined time period may be ninety days.

In some arrangements, the key manager 112 is a hardware security module (HSM). In some arrangements, the key manager 112 and the database server 108 are on the same network node. In some arrangements, the key manager 112 and the database server 108 are on the same network node and the network node is hosted in the cloud. In some arrangements, the key manager 112 and the database server 108 are on different network nodes.

Although one database server 108 is discussed in the arrangement described above, in some arrangements, the third-party data storage system 100 can include a plurality of database servers 108 and the key manager 112 can be configured to communicate with the plurality of database servers 108. In some arrangements, the database servers 108 can each communicate with different groups of data entry entities 104 and different groups of data exit entities 116. In such arrangements, the key manager 112 may use a different public/private key pair and have a separate certificate for each database server 108.

In other arrangements, the third-party data storage system 100 can include a plurality of database servers 108 and a plurality of key managers 112. By way of non-limiting example, in some arrangements, the plurality of database servers 108 can include a first database server and a second database server and the plurality of key managers 112 can include a first key manager and a second key manager. In such an arrangement, the second database server can request user data from the first database server using a data request message similar to the data request message described above with respect to the data exit entity 116. The first database server can retrieve the encrypted CEK corresponding to the requested user data to the first key manager. The first key manager can translate the encrypted CEK as described above using the public key of the second key manager to generate a second encrypted CEK that can be decrypted by the second key manager. The first database server can then send the encrypted user data and the second encrypted CEK to the second database server as described above. In other arrangements, the plurality of database servers can include a different number of database servers and the plurality of key managers can include a different number of key managers that can send and receive encrypted user and encrypted CEKs to and from each other. In some arrangements, the second database server communicates with the one or more data exit entities 116 as described below and the second key manager translates the second encrypted CEK to a third encrypted CEK that can be decrypted by the one or more data exit entities 116 as described above with respect to the first key manager.

The requestor or data exit entity 116 can be a computing system that includes a software program that includes a user input/output device that allows a user to request sensitive user data stored in a third-party data storage system 100, such as the database server 108. For example, the user can request various types of user data corresponding to various users. In some arrangements, the data exit entity 116 is on a single network node. The data exit entity 116 may be administered by a third-party. The data exit entity 116 can be a web browser that includes a software application that allows a user to request sensitive user data stored by the database server 108. In other arrangements, the data exit entity 116 can be a computing system that includes a local software application that allows a user to request sensitive user data stored by the database server 108. In the illustrated arrangement, the data exit entity 116 includes a user input/output device 276, a network interface 280, a memory 284, and a processing circuit 286. The processing circuit 286 includes a message generation circuit 288, a data decryption circuit 292, and an authentication circuit 296.

The user input/output device 276 can include an input device or component of the user input/output device 276 that allows the user to provide information to the data exit entity 116, and may include, for example, a mechanical keyboard, a touchscreen, a microphone, a camera, a fingerprint scanner, any user input device engageable with the data exit entity 116 via a USB, serial cable, Ethernet cable, and so on. The user input/output device 276 can include an output device or component that allows the user to receive information from the data exit entity 116, and may include, for example, a digital display, a speaker, illuminating icons, LEDs, and so on.

The network interface 280 of the data exit entity 116 is adapted for and configured to establish a communication session via the network 120 with the other components of the system 100. As shown in FIG. 2D, the memory 284 is communicably and operatively coupled with the other components of the data exit entity 116. The memory 284 includes a key database 298. The key database 298 includes the certificate 259 of the data exit entity 116 and a public/private key pair of the data exit entity 116.

The message generation circuit 288 is configured to receive a request for sensitive user data via the user input/output device 276. For example, the message generation circuit 288 can provide a user input interface that allows a user to enter a request for one or more pieces of sensitive user data. The message generation circuit 288 may display the prompts or requests on screen, generate audio inputs, etc. using one or more output devices of the output component of the user input/output device 276. The message generation circuit 288 is configured to determine information indicative of the requested user data based on the request for sensitive user data input by the user. The information indicative of the requested user data can include information indicative of a type of user data (e.g., social security number, account number, address, birth date, biometric, etc.) and/or information indicative of an identity of the user (e.g., a name, a reference number, etc.). The message generation circuit 288 is configured to generate a data request message including the information indicative of the requested user data and information indicative of the identity of the data exit entity 116. The information indicative of the identity of the data exit entity 116 (e.g., the requestor identity) can include an IP address, an IMEI number, an instance of a software application running on the data exit entity 116 or a browser running on the data exit entity 116, etc. In some arrangements, the message generation circuit 288 is configured to transmit the data request message to the database server 108 over a secure connection. In some arrangements, the message generation circuit 288 is configured to generate a CMS SignedData message wrapper around the data request message. In some arrangements, the data encryption circuit 220 is configured to generate a CMS SigncryptedData message wrapper around the data request message. In arrangements in which the message generation circuit 288 is configured to generate a CMS SignedData message wrapper or a CMS SigncryptedData message wrapper around the data request message, the key database 298 includes a certificate of the database server 108 that includes a public key of the database server 108.

In some arrangements, the user of the data exit entity 116 may request more than one piece of sensitive user data. In such an arrangement, the data request message includes all of the pieces of requested user data. In some arrangements, the user may request that one or more pieces of sensitive user data are shared with more than one data exit entity 116. In such an arrangement, the data request message includes all of the pieces of requested user data and information indicative of the identities of the data exit entities 116 to which each piece of sensitive user data should be sent.

The data decryption circuit 292 of the data exit entity 116 is configured to receive encrypted user data and the second encrypted CEK from the database server 108. In some arrangements, the database server 108 is configured to transmit the encrypted user data and the second encrypted CEK over a secure connection. Since the encrypted user data and the encrypted CEK are both encrypted, the cleartext sensitive user data and/or the cleartext CEK are not visible at the entrance or the exit of the secure connection. In arrangements which the encrypted user data and the second encrypted CEK are wrapped with a CMS SignedData message wrapper or in which the encrypted user data and the second encrypted CEK are wrapped with a CMS SigncryptedData message wrapper, the database server 108 does not need to transmit the encrypted user data and the encrypted CEK over a secure connection. In arrangements in which the encrypted user data and the second encrypted CEK are wrapped with a CMS SigncryptedData message wrapper, the data decryption circuit 292 can verify the digital signature on the CMS SignedData message and decrypt the second encrypted CEK and the encrypted user data using the public key of the database server 108 and the private key 293 of the data exit entity 116.

In some arrangements, the data decryption circuit 292 is configured to undergo a key encryption key (KEK) protocol with the key manager 112 to generate a KEK with the key manager 112. In some arrangements, the KEK is a symmetric key. In some arrangements, the KEK is an asymmetric key. For example, the KEK can be a public key 226 of the key manager 112. In some arrangements, the KEK can be derived from a pre-shared derivation key (PSDK) based on a message, a unique scheme, a random scheme, and/or a rotational scheme. The data decryption circuit 292 is configured to save the KEK to the key database 298. In some arrangements, the KEK is a named Key. In such arrangements, the KEK (CEK) received by the data exit entity 116 includes the name of the named Key. In such arrangements, the decryption circuit 292 is configured to identify the named Key based on name received with the KEK (CEK). In some arrangements, the data decryption circuit 292 uses the same KEK for all of the CEKs that can be translated by the key manager 112. In such arrangements, the second CEK received by the data exit entity 116 is the second KEK (CEK) that is encrypted with the public key 261 of the data exit entity 116. The data decryption circuit 292 is configured to decrypt the second KEK (CEK) using the private key 293 of the data exit entity 116 to generate the second KEK (CEK). The data decryption circuit 292 is configured to decrypt the second KEK (CEK) with the KEK established with the key manager 112 to recover the cleartext CEK.

The data decryption circuit 292 is configured to recover the cleartext CEK by decrypting the second encrypted CEK using the private key 293 of the data exit entity 116. The data decryption circuit 292 is configured to recover the cleartext sensitive user data by decrypting the encrypted user data using the cleartext second CEK. The data decryption circuit 292 is configured to display the sensitive user data via the output interface of the user input/output device 276. For example, the data decryption circuit 292 can display the sensitive user data on a window of a software application run on a browser of the data exit entity 116 or running locally on the data exit entity 116.

In arrangements in which the user of the data exit entity 116 requested multiple pieces of sensitive user data, the data decryption circuit 292 decrypts each second encrypted CEK and decrypts each piece of encrypted user data and displays each piece of cleartext sensitive user data as described above. In arrangements in which one or more pieces of sensitive user data are requested by one or more data exit entity 116, each data exit entity 116 receives one or more pieces of encrypted user data corresponding to the one or more pieces of requested user data and one or more second CEKs corresponding to each piece of the encrypted user data. Each of the second CEKs has been encrypted with the public key 261 of the data exit entity 116 receiving the encrypted user data and the encrypted CEK. The data decryption circuit 292 of each of the data exit entities 116 decrypts each second CEK and decrypts each piece of encrypted user data and displays each piece of cleartext sensitive user data as described above.

The authentication circuit 296 is configured to validate the data exit entity's certificate 259 that is stored in the key database 298. For example, the authentication circuit 296 can transmit the data exit entity certificate 259 to the certificate authority that issued the data exit entity certificate 259 and ask the certificate authority to confirm that the data exit entity certificate 259 is valid. In some arrangements, the authentication circuit 296 validates the data exit entity certificate 259 every time encrypted user data and an encrypted second CEK is sent to the data exit entity 116. In some arrangements, the authentication circuit 296 validates the data exit entity certificate 259 based on a predefined time period (e.g., hourly). In some arrangements, the authentication circuit 296 validates the data exit entity certificate 259 every time user data is requested via the message generation circuit 288. The authentication circuit 296 is configured to prevent users from requesting sensitive user data in response to determining that the data exit entity certificate 259 is expired or has been revoked. The authentication circuit 296 is configured to read an expiration date of the data exit entity certificate 259 from the data exit entity certificate 259. The authentication circuit 296 is configured to notify an administrator of the data exit entity 116 in response to determining that the data exit entity certificate 259 will expire in less than a predefined time period. In some arrangements, the predefined time period may be ninety days. In arrangements in which the key database 298 includes the certificate of the database server 108, the authentication circuit 296 is configured to validate the database server certificate as described above for the data exit entity certificate 259.

Figure 3A:
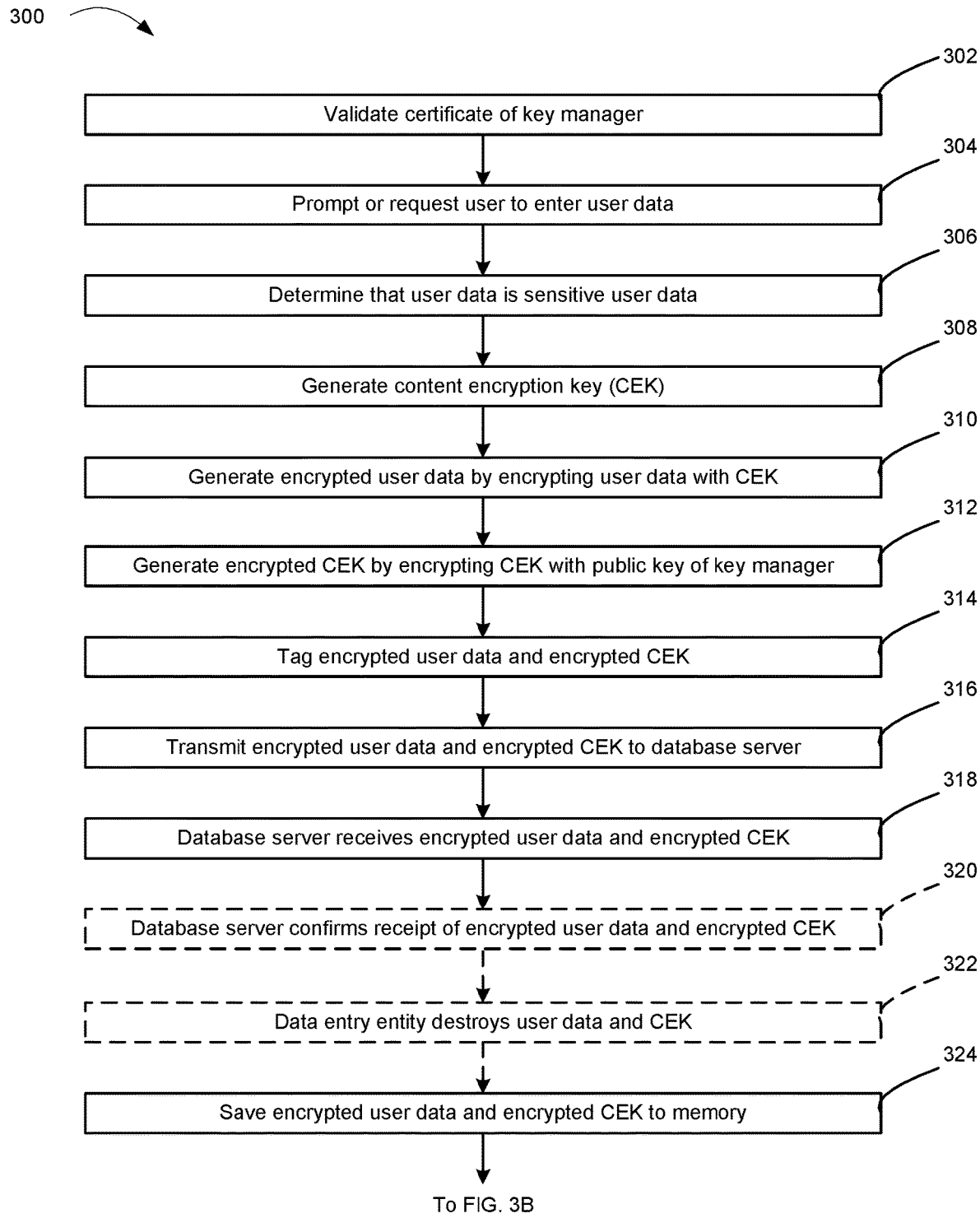
FIGS. 3A-3C are flow diagrams showing processes of protecting user data that is received by, stored on, and requested by one or more third-party computing systems, according to some arrangements.
Figure 3B:
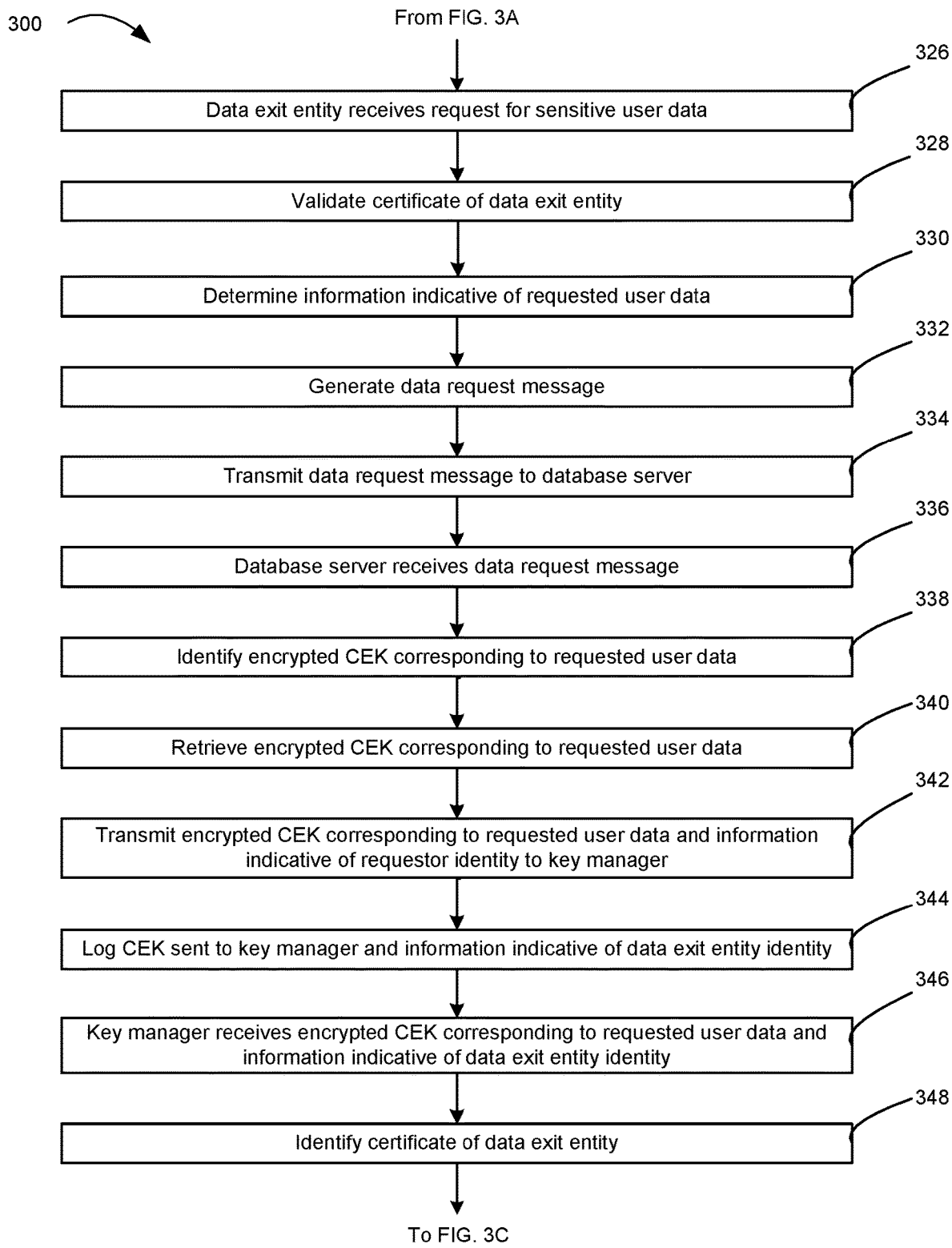
Figure 3C:
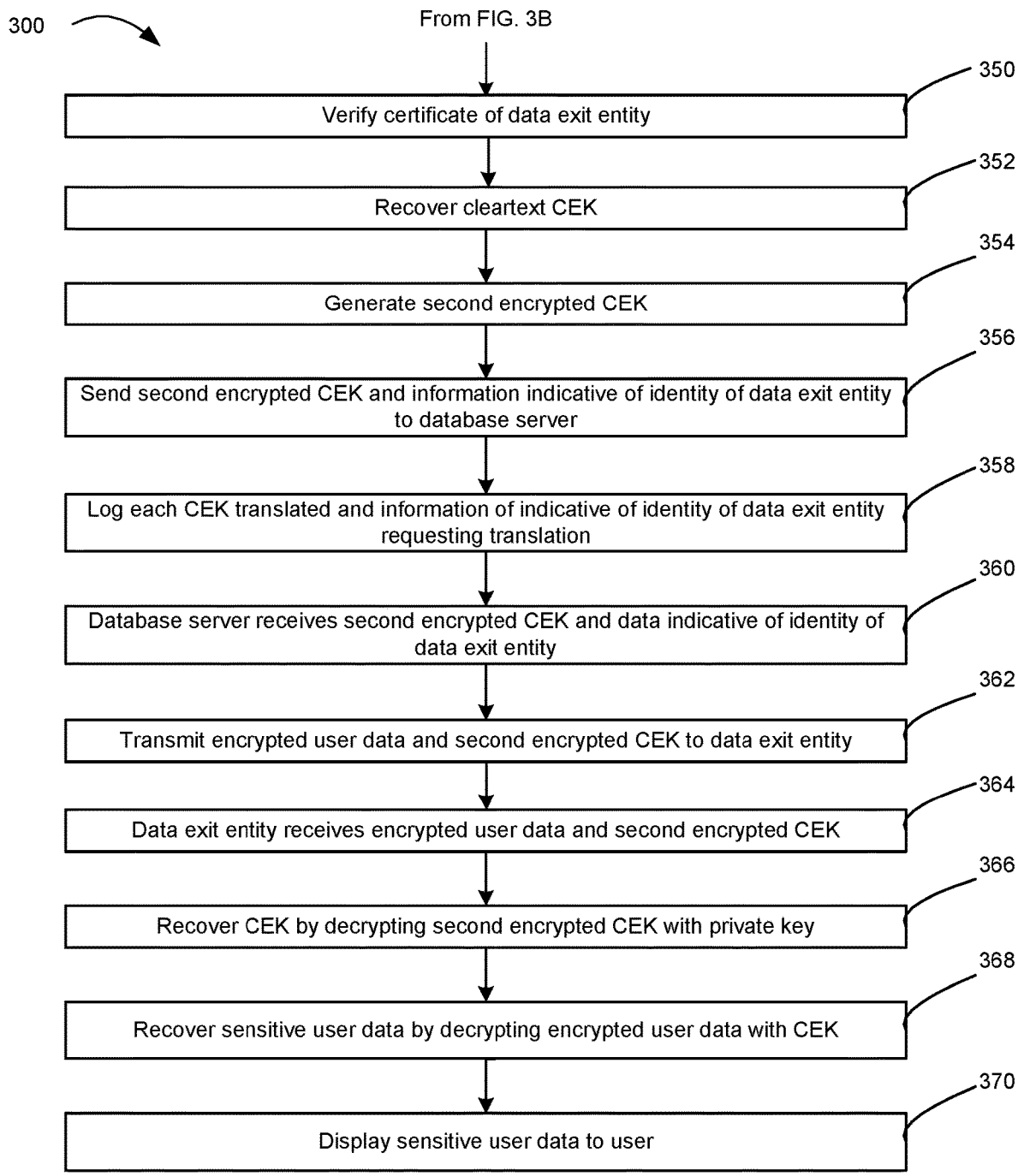

Referring now to FIGS. 3A-3C, a flow diagram of a method 300 for protecting user data received by a data entry entity, stored by a database server, and displayed by a data exit entity that may be administered by third parties is shown, according to an example arrangement. At 302, the authentication circuit 224 of the data entry entity 104 validates the certificate 222 of the key manager 112. For example, the authentication circuit 224 can transmit the key manager certificate 222 to the certificate authority that issued the key manager certificate 222 and ask the certificate authority to confirm that the key manager certificate 222 is valid. In some arrangements, the authentication circuit 224 validates the key manager certificate 222 based on a predefined time period. In some arrangements, the authentication circuit 224 validates the key manager certificate 222 every time user data is entered into the data entry entity 104. In response to determining that the key manager certificate 222 is valid, the authentication circuit 224 allows entry of user data into the data entry entity 104. In some arrangements, the authentication circuit 224 may notify an administrator of the system 100 or the data entry entity 104 in response to determining that the key manager certificate 222 will expire within a predefined time period. In response to determining that the key manager certificate 222 is invalid, the authentication circuit 224 prevents entry of the user data into the data entry entity 104.

At 304, the data encryption circuit 220 prompts or requests the user to enter user data into the data entry entity 104. For example, the user input/output device 204 of the data entry entity 104 can display a prompt or a request for the user to enter user data and provide a text entry window for the user to enter the data. In another example, the user input/output device 204 of the data entry entity 104 can generate an auditory prompt or request for the user to enter data and record an acoustic user response including the user data.

At 306, the data encryption circuit 220 of the data entry entity 104 determines that the user data is sensitive user data. For example, the text entry window and/or the prompt or request for user data can be tagged to indicate that the data entered into the text entry window and/or received in response to the prompt or request is sensitive user data. At 308, the data encryption circuit 220 generates a CEK. The CEK is a symmetric key. At 310, the data encryption circuit 220 generates encrypted user data by encrypting the sensitive user data with the CEK. At 312, the data encryption circuit 220 generates the encrypted CEK by encrypting the CEK with the public key 226 of the key manager 112. For example, the data encryption circuit 220 can encrypt the CEK using CMS-envelope data with the key manager certificate 222. At 314, the data encryption circuit 220 tags the encrypted user data and the encrypted CEK with a tag that is readable by the database server 108. In some arrangements, the tag is a cleartext tag. The tag can include information indicative of the encrypted user data. For example, the information indicative of the encrypted user data can include information indicative of a type of user data corresponding to the encrypted user data and/or information indicative of an identity of a user corresponding to the encrypted user data. At 316, the data encryption circuit 220 transmits the encrypted user data and the encrypted CEK to the database server 108. In arrangements in which the data encryption circuit 220 determines that the data exit entity 116 has received multiple pieces of sensitive user data, the data encryption circuit 220 repeats blocks 310-320 for each piece of sensitive user data.

At 318, the database server 108 receives the encrypted user data and the encrypted CEK from the data entry entity 104 over the secure connection. At optional block 320, the database server 108 transmits a message to the data entry entity 104 indicating that the database server 108 has received the encrypted user data and the encrypted CEK. At optional block 322, the data entry entity 104 destroys the user data and the CEK in response to receiving the message from the database server 108 indicating that the database server 108 has received the encrypted user data and the encrypted CEK. At 324, the database server 108 saves the encrypted user data to the user information database 244 of the memory 236.

At 326, the message generation circuit 288 of the data exit entity 116 receives a request for sensitive user data input by a user using the user input/output device 276. At 328, the authentication circuit 296 of the data exit entity 116 validates the certificate 259 of the data exit entity 116. For example, the authentication circuit 296 can transmit the data exit entity certificate 259 to the certificate authority that issued the data exit entity certificate 259 and ask the certificate authority to confirm that the data exit entity certificate 259 is valid. In response to determining that the data exit entity certificate 259 is valid, the authentication circuit 296 allows entry of a user data request into the data exit entity 116. In some arrangements, the authentication circuit 296 may notify an administrator of the system 100 or the data exit entity 116 in response to determining that the data exit entity certificate 259 will expire within a predefined time period. In response to determining that the data exit entity certificate 259 is invalid, the authentication circuit 296 prevents entry of the user data request into the data exit entity 116.

At 330, the message generation circuit 288 determines information indicative of the requested user data based on the request for sensitive user data input by the user of the data exit entity 116. The information indicative of the requested user data can include information indicative of a type of user data (e.g., social security number, account number, address, birth date, biometric, etc.) and/or information indicative of an identity of the user (e.g., a name, a reference number, etc.). At 332, the message generation circuit 288 generates a data request message including the information indicative of the requested user data and information indicative of the identity of the data exit entity 116. The information indicative of the identity of the data exit entity 116 can include an IP address, an IMEI number, an instance of a software application running on the data exit entity 116 or a browser running on the data exit entity 116, etc. At 334, the message generation circuit 288 transmits the data request message to the database server 108 over a secure connection.

At 336, the data identification circuit 240 receives the data request message from the data exit entity 116. The data request message includes information indicative of the encrypted user data requested by the data exit entity 116 and information indicative of the identity of the data exit entity 116. At 338, the data identification circuit 240 identifies the requested user data based on the information indicative of the encrypted user data included in the tag. For example, the data identification circuit 240 can compare the information indicative of the requested user data to the information indicative of the encrypted user data in the tag to identify the encrypted user data that matches the requested user data. At 340, the data identification circuit 240 retrieves the encrypted CEK corresponding to the encrypted user data that corresponds to the requested user data. At 342, the data identification circuit 240 transmits the encrypted CEK corresponding to the requested user data and the information indicative of the identity of the data exit entity 116 to the key manager 112. At 344, the data identification circuit 240 logs each CEK sent to the key manager 112 and the information indicative of the data exit entity 116 requesting the user information corresponding to each CEK sent to the key manager 112 in the data request log 248.

In some arrangements, the data request message can include one or more pieces of requested user data. In such arrangements, the data identification circuit 240 identifies each piece of encrypted user data corresponding to each piece of requested user data. The data identification circuit 240 repeats blocks 336-344 for each piece of requested user data. In some arrangements, the data request message can include the information indicative of one or more data exit entities 116 and one or more pieces of requested user data. In such arrangements, the data identification circuit 240 repeats blocks 336-344 for each piece of requested user data and transmits the one or more CEKs and the information indicative of the identities of the one or more data exit entities 116 to the key manager 112.

At 346, the translation circuit 260 of the key manager 112 receives the encrypted CEK corresponding to the requested user data and the information indicative of the identity of the data exit entity 116. At 348, the translation circuit 260 identifies the certificate 259 for the data exit entity 116 based on the information indicative of the identity of the data exit entity 116. At 350, the authentication circuit 264 validates the certificate 259 of the data exit entity 116. For example, the authentication circuit 264 can transmit the data exit entity certificate 259 to the certificate authority that issued the data exit entity certificate 259 and ask the certificate authority to confirm that the data exit entity certificate 259 is valid. In some arrangements, the authentication circuit 264 validates the data exit entity certificate 259 based on a predefined time period. In some arrangements, the authentication circuit 264 validates the data exit entity certificate 259 every time the key manager 112 receives the information indicative of the identity of the data exit entity 116. In response to determining that the data exit entity certificate 259 is valid, the authentication circuit 264 allows translation of the CEK. In some arrangements, the authentication circuit 264 may notify an administrator of the system 100 or the key manager 112 in response to determining that the data exit entity certificate 259 will expire within a predefined time period. In response to determining that the data exit entity certificate 259 is invalid, the authentication circuit 264 prevents translation of the CEK.

At 352, the translation circuit 260 recovers the cleartext CEK by decrypting the encrypted CEK with the private key 249 of the key manager 112. At 354, the translation circuit 260 generates a second encrypted CEK by encrypting the cleartext CEK with the public key 261 of the data exit entity 116. The second encrypted CEK can be decrypted by the data exit entity 116 using its private key 293. At 356, the translation circuit 260 transmits the second encrypted CEK and the information indicative of the identity of the data exit entity 116 to the database server 108. At 358, the translation circuit 260 logs each CEK translated and the information of the identity of each data exit entity 116 requesting translation of each CEK in the CEK translation log 272. The key manager 112 excludes the encrypted user data. The key manager 112 does not transmit or receive any encrypted user data. Accordingly, an administrator of the key manager 112 cannot access the user data, let alone decrypt the encrypted user data to recover the cleartext sensitive user data.

At 360, the data identification circuit 240 of the database server 108 receives the second encrypted CEK and the information indicative of the identity of the data exit entity 116. At 362, the data identification circuit 240 retrieves the encrypted user data corresponding to the second encrypted CEK. At 362, the data identification circuit 240 transmits the encrypted user data and the second encrypted CEK to the data exit entity 116 over a secure connection. As described herein, the database server 108 excludes the private key 249 of the key manager 112. Therefore, the database server 108 cannot decrypt the encrypted CEKs and use the encrypted CEKs to decrypt the encrypted user data.

At 364, the data decryption circuit 292 of the data exit entity 116 receives the encrypted user data and the second encrypted CEK from the database server 108 over the secure connection. Since the encrypted user data and the encrypted CEK are sent over the secure connection, the cleartext sensitive user data and the cleartext CEK are not visible at the entrance and the exit ends of the secure connection. At 366, the data decryption circuit 292 recovers the cleartext CEK by decrypting the second encrypted CEK with the private key 293 of the data exit entity 116. At 368, the data encryption circuit 220 recovers the sensitive user data by decrypting the encrypted user data with the cleartext CEK. At 370, the data decryption circuit 292 displays the sensitive user data to the user of the data exit entity 116. For example, the data decryption circuit 292 can display the sensitive user data on a window of a software application run on a browser of the data exit entity 116 or running locally on the data exit entity 116.

In some arrangements, the user may request more than one piece of user data. In such an arrangement, the data request message includes all of the pieces of requested user data. The data exit entity 116 repeats blocks 364-370 for each piece of requested user data. In some arrangements, the user may request that one or more pieces of sensitive user data are shared with more than one data exit entity 116. In such an arrangement, the data request message includes all of the pieces of requested user data and information indicative of the identities of the data exit entities 116 to which each piece of sensitive user data should be sent. Each of the data exit entities 116 then completes blocks 364-370 for each piece of encrypted user data received.

Figure 4:
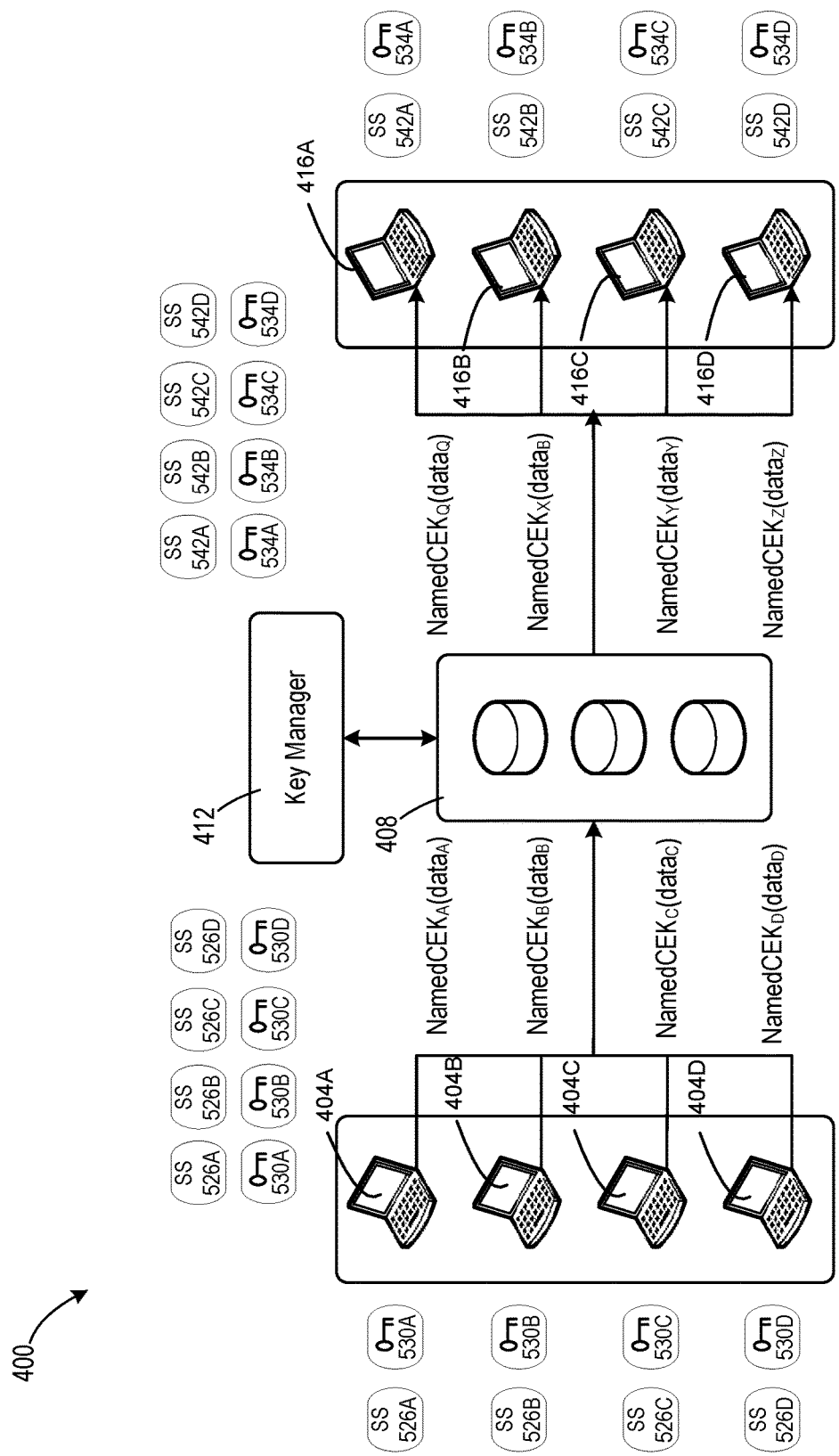
FIG. 4 is a block diagram illustrating an environmental view of a system for protecting user data received by, stored on, and requested by one or more third-party computing systems according to some arrangements.
Figure 5:
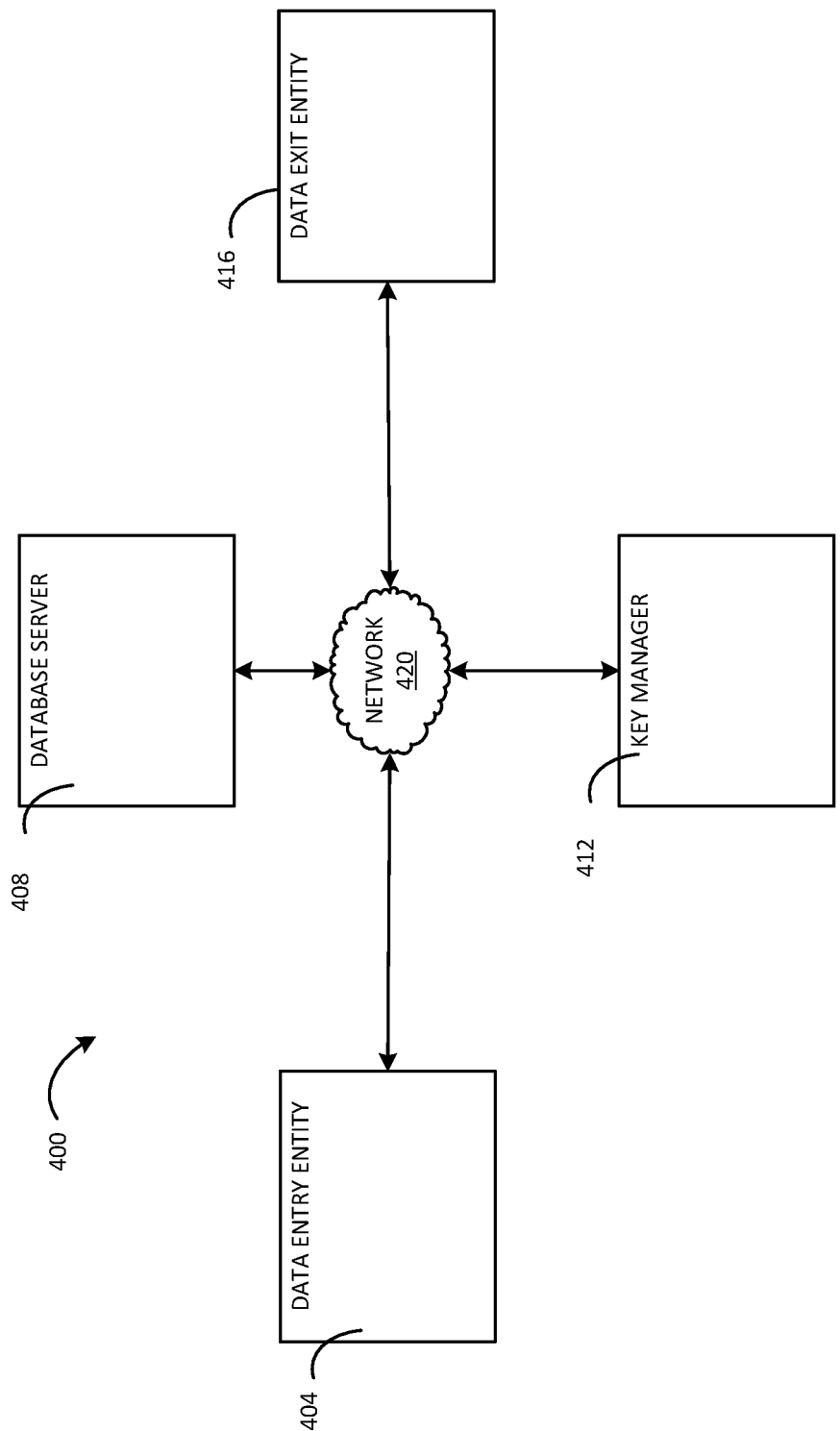
FIG. 5 is a block diagram illustrating another environmental view of the system of FIG. 2 according to some arrangements.
Figure 5B:
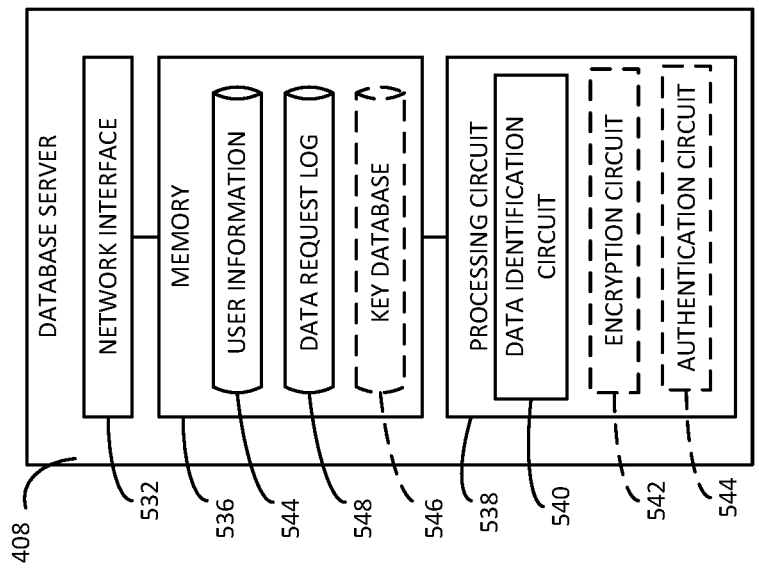
FIG. 5B is a block diagram illustrating an environmental view of a database server of FIG. 5 according to some arrangements.

Referring now to FIGS. 4-5, an environmental view of a system 400 for protecting user data that is entered into a third-party data entry device, sent to and stored on a third-party database server, and displayed and/or used by a third-party data exit computing system is shown. The sensitive user data can include identity information such as a social security number, account number, date of birth, biometric data (e.g., a stored image of a fingerprint, retina, or other body part to be used to authenticate the user). As shown in FIGS. 4-5, the system 400 incudes one or more data entry entities 404, a database server 408, a key manager 412, and one or more requestors or data exit entities 416 connected by a network 420. For example, the system 400 illustrated in FIG. 4 includes four data entry entities 404A-404D and four data exit entities 416A-416D that are in communication with the database server 408 over the network 420. In other arrangements, the system 400 can include a different number of data entry entities 404 and data exit entities 416. While the data entry entity 404, the database server 408, the key manager 412, and the data exit entity 416 are shown as being on separate network nodes in FIGS. 4-5, in some arrangements, the database server 408 and the key manager 412 can be on the same network node.

Figure 5A:
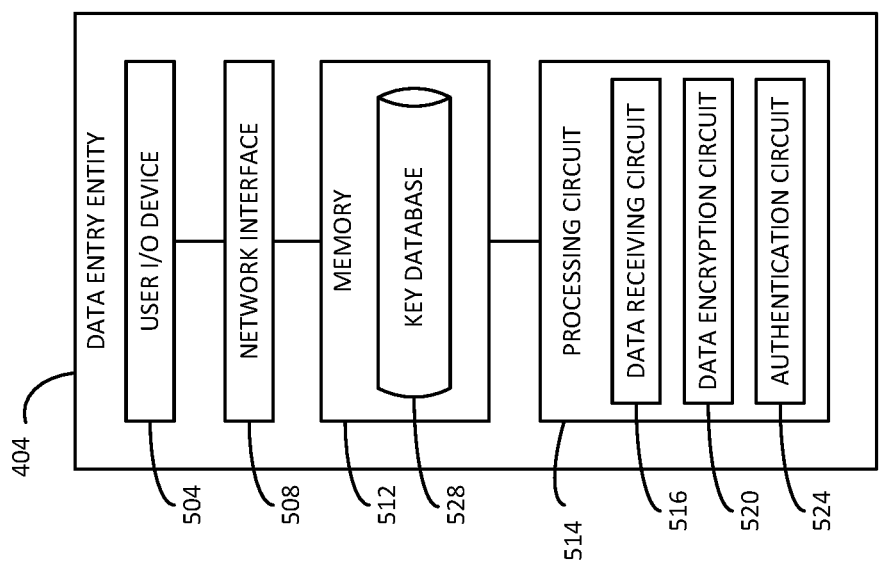
FIG. 5A is a block diagram illustrating an environmental view of a data entry entity of FIG. 5 according to some arrangements.
Figure 5D:
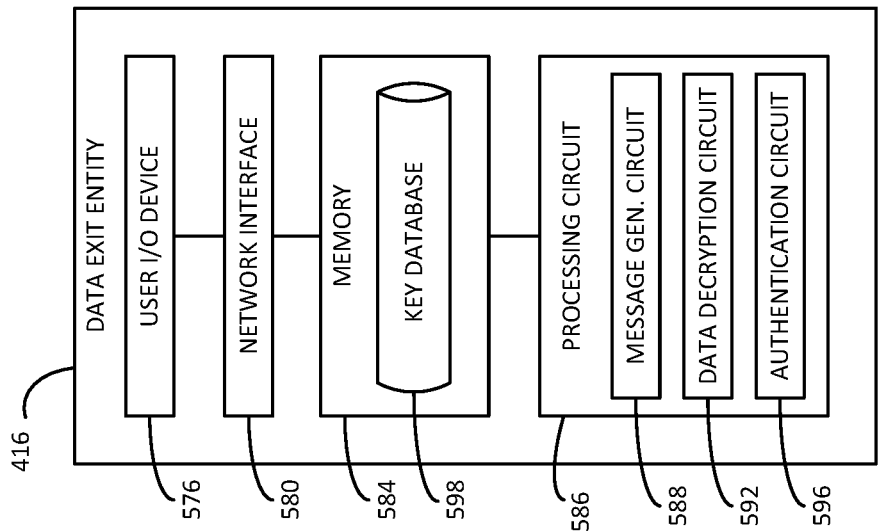
FIG. 5D is a block diagram illustrating an environmental view of a data exit entity of FIG. 5 according to some arrangements.

The data entry entity 404 is a computing system that includes a software program that requests that a user enter sensitive user data to be stored by the database server 408. The data entry entity 404 may be administered by a third-party. The data entry entity 404 can include a web browser that includes a software application that requests that the user enter sensitive user data to be stored by the third-party data storage system 400. In other arrangements, the data entry entity 404 can include a local software application that requests that the user enter sensitive data to be stored by the third-party data storage system 400. In some arrangements, the data entry entity 404 is on a single network node. As shown in FIG. 5A, the illustrated arrangement, the data entry entity 404 includes a user input/output device 504, a network interface 508, a memory 512, and a processing circuit 514. The processing circuit 514 includes a data receiving circuit 516, a data encryption circuit 520, and an authentication circuit 524. The user input/output device 504, the network interface 508, the memory 512, the data encryption circuit 520, and the authentication circuit 524 are substantially similar to the user input/output device 204, the network interface 208, the memory 212, the data receiving circuit 216, and the authentication circuit 224, respectively, described with respect to the data entry entity 104 and are not discussed in detail herein.

As shown in FIG. 5, the memory 512 is communicably and operatively coupled with the other components of the data entry entity 404. The memory 512 includes a key database 528.

The data encryption circuit 520 is configured to undergo a public key cryptography (PKC) agreement protocol with the key manager 412. During the PKC agreement protocol, the data encryption circuit 520 and the key manager 412 exchange public keys and compute a shared secret 526. The data encryption circuit 520 is configured to obfuscate the shared secret 526 and store the obfuscated shared secret 526 to the memory 512. In some arrangements, the PKC agreement protocol can be a Diffie-Hellman protocol, an elliptic curve Diffie-Hellman protocol, another post-quantum cryptography protocol, etc. The data encryption circuit 520 is configured to derive a content encryption key (CEK) from the shared secret 526. In some arrangements, the CEK is an ephemeral key and only one CEK is derived from the shared secret 526. One of the data encryption circuit 520 or the key manager 412 is configured to generate a name for the CEK and transmit the name to the other of the data encryption circuit 520 and the key manager 412. As referred to herein, the phrase "first named CEK" refers to one or more CEKs generated based on the shared secret 526 generated between the data entry entity 404 and the key manager 412. The name includes information indicative of how to recover the first named CEK 530 based on the shared secret 526. In some arrangements, the name indicates an algorithm for regenerating the first named CEK 530 based on the shared secret 526. For example, the illustrated arrangement illustrates four first named CEKs 530A-530D and four shared secrets 526A-526D. Each of the first named CEKs 530A-530D has been generated based on the respective shared secret 526A-526D established between the respective data entry entity 404A-404D and the key manager 412. Other arrangements can include different numbers of first named CEKs 530.

The data encryption circuit 520 is configured to recognize one or more pieces of the user data as being sensitive user data. In some arrangements, data entry interfaces (e.g., data entry windows on a website application or a software program) can be tagged as sensitive data entry windows that receive sensitive user data, as described above. In some arrangements, the same first named CEK 530 is used to encrypt each piece of sensitive user data. In arrangements that use ephemeral keys, the data encryption circuit 520 is configured to generate a different first named CEK 530 for each message and/or communication session between the data entry entity 404 and the key manager 412. In some arrangements in which a separate CEK is desired for each piece of sensitive user data input by the user, the pieces of sensitive user data can be sent using different messages. In some arrangements in which a separate CEK is desired for each piece of sensitive user data, the data encryption circuit 520 can generate a temporary derivation key based on the shared secret 526. The temporary derivation key is not saved to the key database 528 of the memory 512. The data encryption circuit 520 can derive unique CEKs for each piece of sensitive user data using the temporary derivation key. The data encryption circuit 520 is configured to generate encrypted user data by encrypting the sensitive user data with the first named CEK 530.

The data encryption circuit 520 is configured to tag the encrypted user data and the first named CEK 530 with a tag that is readable by the database server 408. The database server 408 can read the tag without decrypting any of the encrypted user data. In some arrangements, the tag is a cleartext tag. The tag can include information indicative of the encrypted user data. The information indicative of the user data can include information indicative of a type of user data (e.g., social security number, account number, address, birth date, biometric, etc.) and/or information indicative of an identity of the user (e.g., a name, a reference number, etc.). In some arrangements, the name of the first named CEK 530 is included in the tag. In some arrangements, the data encryption circuit 520 is configured to transmit the encrypted user data and the name of the first named CEK 530 to the database server 408 over a secure connection. Since the encrypted user data is sent over the secure connection, the cleartext sensitive user data is not visible at the entrance and exit of the secure connection. In some arrangements, the secure connection can be a TLS connection. The data encryption circuit 520 is configured to destroy the first named CEK 530 and the user data in response to receiving a message from the database server 408 indicating that the encrypted user data has been received by the database server 408.

In some arrangements, the data encryption circuit 520 can receive more than one piece of sensitive user data. When more than one piece of sensitive user data is received, the data encryption circuit 520 is configured to generate a new first named CEK 530 for each piece of sensitive user data as described above. The data encryption circuit 520 is configured to generate encrypted user data from each piece of sensitive user data by encrypting each piece of sensitive user data with the respective first named CEK 530 generated for that piece of sensitive user data. The data encryption circuit 520 is configured to generate a tag for each piece of encrypted user data and the name of each first named CEK 530 corresponding to each piece of encrypted user data as described above.

In some arrangements, the data encryption circuit 520 is configured to generate a CMS SigncryptedData message wrapper around the encrypted user data and the name of the first named CEK 530, which can provide the functionality of nested SignedData (EnvelopedData) messages. In such an arrangement, the key database 528 includes a public/private key pair of the of the data entry entity 404. Such arrangements do not require a secure connection, such as the secure tunnel provided by TLS.

The database server 408 is a secure computing system that is configured to store encrypted user data received from data entry entities 404 connected to the network 420. The database server 408 may be administered by a third-party. In some arrangements, the database server 408 is hosted in the cloud. As shown in FIG. 4B, the database server 408 includes a network interface 532, a memory 536, and a processing circuit 538. The processing circuit 538 includes a data identification circuit 540. The network interface 532 and the memory 536 are substantially similar to the network interface 232 and the memory 236, respectively, described with respect to the database server 108 and are not discussed in greater detail herein.

The memory 536 is communicably and operatively coupled with the other components of the database server 408. The memory 536 includes a user information database 544 and a data request log 548. The user information database 544 includes encrypted user data and the names of the first named CEKs 530 that correspond to the encrypted user data. The data request log 548 includes a list of encrypted user data requested by the data exit entity 416 and information indicative of the identity of the data exit entity 416. The memory 536 excludes the private key of the key manager 412, the shared secret 526 generated between the data entry entity 404 and the key manager 412, the first named CEK 530, the shared secret 526 generated between the data exit entity 416 and the key manager 412, and a second named CEK 534 (described in greater detail below). The private key of the key manager 412, the shared secret 526 generated between the data entry entity 404 and the key manager 412, the first named CEK 530, the shared secret 526 generated between the data exit entity 416 and the key manager 412, and the second named CEK 534 are not stored to the memory 536. Accordingly, the database server 408 and/or the administrators of the database server 408 cannot decrypt the encrypted user data to access cleartext sensitive user data. Furthermore, unauthorized parties cannot access the sensitive user data even if the unauthorized parties gain access to the database server 408. Stated another way, the database server 408 does not have access to the private keys stored in the key manager 412, the shared secret 526 generated between the data entry entity 404 and the key manager 412, the first named CEK 530, the shared secret 526 generated between the data exit entity 416 and the key manager 412, the second named CEK 534, and the cleartext sensitive user data.

The database server 408 is configured to receive the encrypted user data and the name of the first named CEK 530 corresponding to the encrypted user data. In arrangements in which the data entry entity 404 transmits the encrypted user data and the name of the first named CEK 530 over a secure connection, cleartext sensitive user data is not present at the end of the secure connection. Furthermore, the database server 408 cannot recover the first named CEK 530 based on the name of the first named CEK 530. Therefore, the database server 408 cannot decrypt the encrypted user data to access the cleartext sensitive user data. This allows the database server 408 to be administered by an entity that might not be authorized to access the sensitive user data. The database server 408 is configured to save the encrypted user data and the name of the first named CEK 530 to the user information database 544 in the memory 536. The database server 408 is configured to transmit a message to the data entry entity 404 to confirm that the encrypted user data has been received.

The data identification circuit 540 is configured to receive a data request message from the data exit entity 416. The data request message can include information indicative of the requested user data, information indicative of an identity of the data exit entity 416 and/or a name of a second named CEK 534. As referred to herein, the phrase "second named CEK" refers to one or more CEKs generated based on a shared secret 542 generated between the data exit entity 416 and the key manager 412 as described in greater detail below. The information indicative of the requested user data can include information indicative of an identity of the user corresponding to the encrypted user data, information indicative of a type of user data, etc. The information indicative of the identity of the data exit entity 416 can include an IP address of the data exit entity 416, an IMEI number of the data exit entity 416, an instance of a software application running on the data exit entity 416, etc. The data identification circuit 540 is configured to identify the encrypted user data requested by the data exit entity 416 based on the information indicative of the encrypted user data included in the tag. For example, the data identification circuit 540 can read the information indicative of the requested user data from the data request message and compare the information indicative of the requested user data to the information indicative of the encrypted user data in each of the tags to identify a match. During this process, the data identification circuit 540 does not decrypt the encrypted user data. The data identification circuit 540 is configured to retrieve the encrypted user data corresponding to the requested user data. The data identification circuit 540 is configured to transmit the encrypted user data, the name of the CEK, and the information and the information indicative of the identity of the data exit entity 416 and/or the name of the second named CEK 534 to the key manager 412. The data identification circuit 540 is configured to log each piece of user data requested and the data exit entity 416 or data exit entities 416 requesting each piece of user data in the data request log 548 stored in the memory 536.

In some arrangements, the data identification circuit 540 receives second encrypted user data and the information indicative of the identity of the data exit entity 416 from the key manager 412. The second encrypted user data has been translated by the key manager 412 as described in greater detail below so that the data exit entity 416 can decrypt the second encrypted user data. As described in greater detail below, translated encrypted user data is sensitive user data that has been encrypted using the second named CEK 534. The data identification circuit 540 is configured to transmit the second encrypted user data to the data exit entity 116. In some arrangements, the data identification circuit 540 is configured to transmit the second encrypted user data. Since the second encrypted user data is encrypted, no cleartext sensitive user data is present at the entrance or exit of the secure connection. In some arrangements, the data identification circuit 540 is configured to generate a CMS SigncryptedData message wrapper around the second encrypted user data, which can provide the functionality of nested SignedData (EnvelopedData) messages. Such arrangements do not require a secure connection, such as the secure tunnel provided by TLS. The data identification circuit 540 handles second, third, etc. data request messages from the data exit entity 416 or other data exit entities 416 as described above.

In some arrangements, the data request message can include one or more pieces of requested user data. In such an arrangement, the data identification circuit 540 can identify each piece of encrypted user data corresponding to each piece of requested user data based on the information indicative of the encrypted user data in the tag. The data identification circuit 540 does not decrypt the encrypted user data or access the cleartext sensitive user data when identifying each piece of encrypted user data corresponding to each piece of requested user data. The data identification circuit 240 transmits the encrypted user data corresponding to the requested user data, the name of the first named CEK 530, and the name of the second named CEK 534, and/or the information indicative of the identity of the data exit entity 416 to the key manager 112.

In some arrangements, the data request message can include the information indicative of one or more data exit entities 416 and/or the names of second named CEKs 534 previously established between the key manager 412 and one or more data exit entities 416 and one or more pieces of requested user data. In such arrangements, the data identification circuit 540 can retrieve the one or more pieces of encrypted user data corresponding to the one or more pieces of requested user data and transmit the one or more pieces of encrypted user data, the name of the first encrypted CEK 530, and the names of the second named CEKs 534 to the key manager 412.

In such arrangements, the data identification circuit 540 is configured to receive pieces of second encrypted user data from the key manager 412 corresponding to each of the data exit entities 416. The data identification circuit 540 is configured to transmit the second encrypted user data to each of the data exit entities 416. In some arrangements, the data identification circuit 540 transmits the translated encrypted user data over a secure connection. Since the second encrypted user data is encrypted, no cleartext sensitive user data is exposed at the entrance or exit of the secure connection.

In some arrangements, the data identification circuit 540 is configured to transmit one or more pieces of encrypted user data to one or more of the data exit entities 416 according to a predefined schedule. In such arrangements, the data exit entity 416 is configured to send a message to the database server 408 that establishes the predefined schedule and an identity of one or more data entry entities 404, information indicative of one or more types of encrypted user data, and/or one pieces of information indicative of an identity of a user to send to the data exit entity 416 according to the predefined schedule. The data identification circuit 540 is configured to identify the encrypted user data based on the tag and send the encrypted user data, the name of the first named CEK 530 corresponding to the encrypted user data, and the name of each of the one or more second named CEKs 534 corresponding to each of the one or more data exit entities 416 to the key manager 412 as described above.

In some arrangements, the data entry entity 404 is configured to transmit instructions that include information indicative of one or more data exit entities 416 and that command the database server 408 to send the encrypted user data to one or more data exit entities 416. In some arrangements, the instructions are included in the tag. In other arrangements, the instructions are sent with the encrypted user data in another manner, such as a CMS SigncryptedData message wrapper. The data identification circuit 540 is configured to identify the instructions sent with the encrypted user data and send the encrypted user data, the name of the first named CEK 530, and the information indicative of the one or more data exit entities 416 to the key manager 412 as described above.

Figure 5C:
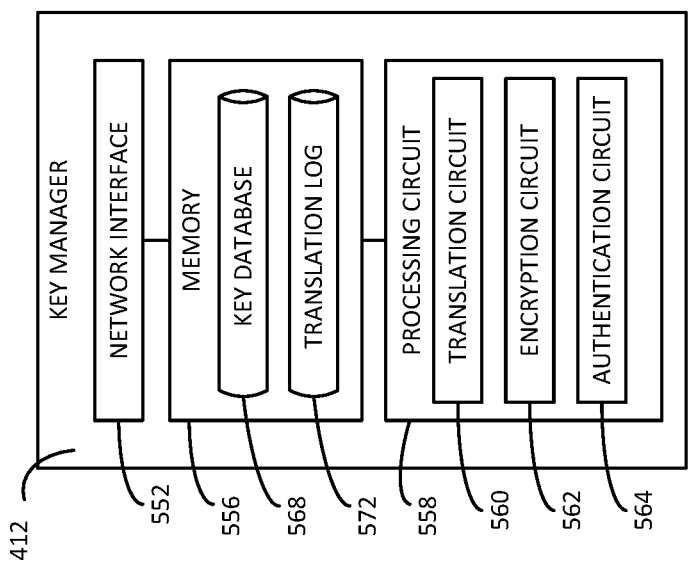
FIG. 5C is a block diagram illustrating an environmental view of a key manager of FIG. 5 according to some arrangements.

As shown in FIG. 5C, the key manager 412 includes a network interface 552, a memory 556, and a processing circuit 558. The processing circuit 558 includes a translation circuit 560, an encryption circuit 562, and an authentication circuit 564. The network interface 552, the memory 556, and the authentication circuit 564 are substantially similar to the network interface 252, the memory 256, and the authentication circuit 264, respectively, described with respect to the key manager 112 and are not discussed in detail herein.

The memory 556 includes a key database 568 and a data translation log 572. In some arrangements, the key database 568 includes a public/private key pair of the key manager 412 and a certificate for each data exit entity 416 authorized to receive user data from the database server 408. In such arrangements, only data exit entities 416 having valid certificates can receive encrypted user data from the database server 408. The data translation log 572 includes a list including information indicative of the encrypted user data translated by the key manager 412 and the one or more data exit entities 416 requesting each piece of second encrypted user data. The key manager 412 does not store translated or cleartext used data in the memory 556.

The encryption circuit 562 is configured to undergo PKC agreement protocols with the one or more data entry entities 404 and the one or more data exit entities 416 of the system 400. During the PKC agreement protocol with the data entry entity 404, the encryption circuit 562 and the data entry entity 404 (e.g., the data encryption circuit 520) exchange public keys and compute the shared secret 526. The encryption circuit 562 is configured to obfuscate the shared secret 526 and store the obfuscated shared secret 526 to the memory 556. In some arrangements, the PKC agreement protocol can be a Diffie-Hellman protocol, an elliptic curve Diffie-Hellman protocol, another post-quantum cryptography protocol, etc. The data encryption circuit 520 is configured to derive a CEK from the shared secret 526. For example, the data encryption circuit 520 can input the shared secret 526 into a key derivation function (KDF) to derive the CEK from the shared secret 526. In some arrangements, the KDF is described as in PKCS #5 or NIST SP 8-63B, both of which are incorporated by reference herein. The one of the encryption circuit 562 or the data entry entity 404 is configured to generate a name for the CEK (e.g., the first named CEK 530) and to transmit the name to the other of the data encryption circuit 520 and the data entry entity 404. The encryption circuit 562 stores the first named CEK and the name of the first named CEK 530 to the key database 568 of the memory 556.

During the PKC agreement protocol with the data exit entity 416, the encryption circuit 562 and the data exit entity 416 (e.g., the data encryption circuit 520) exchange public keys and compute the shared secret 542. The encryption circuit 562 is configured to obfuscate the shared secret 542 and save the obfuscated shared secret 542 to the memory 556. In some arrangements, the PKC agreement protocol can be a Diffie-Hellman protocol, an elliptic curve Diffie-Hellman protocol, another post-quantum cryptography protocol, etc. In some arrangements, the encryption circuit 562 is configured to derive a CEK from the shared secret 542. In some arrangements, the encryption circuit 562 is configured to use a KDF to derive a temporary derivation key that can be used to derive multiple CEKs. In such an arrangement, separate CEKs can be derived for each piece of sensitive user data. One of the encryption circuit 562 or the data exit entity 416 is configured to generate a name for the CEK (e.g., the second named CEK 534) and transmit the name to the other of the encryption circuit 562 and the data exit entity

416. The encryption circuit 562 stores the second named CEK 534 and the name of the second named CEK 534 to the key database 568 of the memory 556. In some arrangements in which a separate CEK is desired for each piece of sensitive user data, the encryption circuit 562 can generate a temporary derivation key based on the shared secret 542. The temporary derivation key is not saved to the memory 556. The encryption circuit 562 can derive unique CEKs for each piece of sensitive user data using the temporary derivation key. The illustrated arrangement illustrates four second named CEKs 534A-534D and four shared secrets 542A-542D. Each of the second named CEKs 534A-534D has been generated based on the respective shared secret 542A-542D established between the respective data exit entity 416A-416D and the key manager 412. Other arrangements can include different numbers of second named CEKs 534.

The translation circuit 560 is configured to receive the encrypted user data, the name of the first named CEK 530, and the name of the second named CEK 534 and/or the information indicative of the identity of the data exit entity 416 from the database server 408. The translation circuit 560 is configured to recover the first named CEK 530 based on the name of the first named CEK 530. The translation circuit 560 is configured to decrypt the encrypted user data using the first named CEK 530 to recover the cleartext sensitive user data. The translation circuit 560 is configured to recover the second named CEK 534 based on the name of the second named CEK 534. The translation circuit 560 is configured to encrypt the cleartext sensitive user data using the second named CEK 534 to generate second encrypted user data. As used herein, data translation refers to decrypting a piece of encrypted user data with the first named CEK 530 to recover cleartext sensitive user data and encrypting the cleartext sensitive user data with the second named CEK 534 to generate second encrypted user data. The translation circuit 560 is configured to transmit the second encrypted user data and the information indicative of the identity of the data exit entity 416 to the database server 408. In some arrangements, the translation circuit 560 is configured to transmit the second encrypted user data to the data exit entity 416.

In some arrangements, the translation circuit 560 can receive one or more pieces of encrypted user data, the name(s) of one more first named CEKs 530, and one or more second named CEKs 534 and/or information indicative of one or more data exit entities 416. The translation circuit 560 is configured to recover the first named CEKs 530 based on the name(s) of the one or more first named CEKs 530. The translation circuit 560 is configured to decrypt each piece of encrypted user data using the first named CEK 530 for that piece of encrypted user data to recover cleartext sensitive user data. The translation circuit 560 is configured to identify the second named CEKs 534 corresponding to each of the one or more data exit entities 416 that request the encrypted user data based on the names and/or the information indicative of the identity of the one or more data exit entities 416. The translation circuit 560 is configured to encrypt the one or more pieces of cleartext sensitive user data with the second named CEKs 534 of each of the data exit entities 416 that have requested the encrypted user data. The translation circuit 260 is configured to log each translation request in the data translation log 572. For example, the translation circuit 260 is configured to save a record of information indicative of each piece of encrypted user data translated and the data exit entity 416 or data exit entities 416 requesting the translation in the data translation log 572. In some arrangements, the translation circuit 260 is configured to log translation requests from data exit entities 416 having invalid certificates in the data translation log 572.

In some arrangements, the key manager 412 is a hardware security module (HSM). In some arrangements, the key manager 412 and the database server 408 are on the same network node. In some arrangements, the key manager 412 and the database server 408 are on the same network node and the network node is hosted in the cloud. In some arrangements, the key manager 412 and the database server 408 are on different network nodes.

Although one database server 408 is discussed in the arrangement described above, in some arrangements, the third-party data storage system 400 can include a plurality of database servers 408 and the key manager 412 can be configured to communicate with the plurality of database servers 408. In some arrangements, the database servers 408 can each communicate with different groups of data entry entities 404 and different groups of data exit entities 416. In such arrangements, the key manager 412 may use a different public/private key pair for each database server 408.

In other arrangements, the third-party data storage system 400 can include a plurality of database servers 408 and a plurality of key managers 412. By way of non-limiting example, in some arrangements, the plurality of database servers 408 can include a first database server and a second database server and the plurality of key managers 412 can include a first key manager and a second key manager. In such an arrangement, the second database server can request user data from the first database server using a data request message similar to the data request message described above with respect to the data exit entity 416. The first database server can retrieve the encrypted user data and the name of the first named CEK 530 corresponding to the requested user data and transmit the encrypted user data and the name of the first named CEK 530 to the first key manager. The first key manager can translate the encrypted user data as described above to generate second encrypted user data that can be decrypted by the second key manager. The first database server can then send the encrypted user data and the name of a second named CEK 534 established between the first key manager and the second key manager to the second database server in a manner similar to what is described above. In other arrangements, the plurality of database servers can include a different number of database servers and the plurality of key managers can include a different number of key managers that can send and receive encrypted user data and the names of previously established named CEKs to and from each other. In some arrangements, the second database server communicates with the data exit entities 416 as described below and the second key manager translates the encrypted user data as described above to generate third encrypted user data that is encrypted with a third named CEK established between the second key manager and one of data exit entities 416 to generate third encrypted user data that can be decrypted by the data exit entity 416 as described above with respect to the first key manager.

The requestor or data exit entity 416 can be a computing system that includes a software program that includes a user input/output device 576 that allows a user to request sensitive user data stored in a third-party data storage system 400, such as the database server 408. For example, the user can request various types of user data corresponding to various users. In some arrangements, the data exit entity 416 is on a single network node. The data exit entity 416 may be administered by a third-party. The data exit entity 416 can be a web browser that includes a software application that allows a user to request sensitive user data stored by the database server 408. In other arrangements, the data exit entity 416 can be a computing system that includes a local software application that allows a user to request sensitive user data stored by the database server 408. In the illustrated arrangement, the data exit entity 416 includes a user input/output device 576, a network interface 580, a memory 584, and a processing circuit 586. The processing circuit 586 includes a message generation circuit 588, a data decryption circuit 592, and an authentication circuit 596. The user input/output device 576, the network interface 580, the memory 584, the message generation circuit 588, and the authentication circuit 596 are substantially similar to the user input/output device 576, the network interface 280, the memory 584, the message generation circuit 288, and the authentication circuit 296, respectively, of the data exit entity 116 described above and are not discussed in detail herein.

As shown in FIG. 5C, the memory 584 is communicably and operatively coupled with the other components of the data exit entity 416. The memory 584 includes a key database 598. The key database 598 includes a public/private key pair. The key database 598 further includes one or more second named CEKs 534. The key database 598 includes a name that corresponds to each of the one or more second named CEKs 534.

In some arrangements, the user of the data exit entity 416 may request more than one piece of sensitive user data. In such an arrangement, the data request message includes all of the pieces of requested user data. In some arrangements, the user may request that one or more pieces of sensitive user data are shared with more than one data exit entity 416. In such an arrangement, the data request message includes all of the pieces of requested user data and information indicative of the identities of the data exit entities 416 to which each piece of sensitive user data should be sent.

The message generation circuit 588 is substantially similar to the message generation circuit 288 described above with respect to the data exit entity 116. However, the message generation circuit 588 is further configured to include a name of the second named CEK 534 in the data request message. In some arrangements, the data request message includes both the name of the second named CEK 534 and the information indicative of the identity of the data exit entity 416.

The data decryption circuit 592 is configured to undergo a PKC agreement protocol with the key manager 412. During the PKC agreement protocol with the key manager 412, the data decryption circuit 592 and the key manager 412 (e.g., the encryption circuit 562) exchange public keys and compute the shared secret 542. The data decryption circuit 592 is configured to obfuscate the shared secret 542 and store the obfuscated shared secret 542 in the memory 584. In some arrangements, the PKC agreement protocol can be a Diffie-Hellman protocol, an elliptic curve Diffie-Hellman protocol, another post-quantum cryptography protocol, etc. The data encryption circuit 520 is configured to derive a CEK from the shared secret 542. The one of the data decryption circuit 592 or the key manager 412 is configured to generate a name for the CEK (e.g, the second named CEK 534) and transmit the name to the other of the data encryption circuit 520 and the key manager 412. The data decryption circuit 592 stores the second named CEK 534 and the name of the second named CEK 534 to the key database 598 of the memory 584. In arrangements in which the system 400 includes one or more key managers 412, the data decryption circuit 592 is configured to undergo a PKC agreement protocol with one or more of the key managers 412 in the system 400.

The data decryption circuit 592 of the data exit entity 416 is configured to receive the second encrypted user data from the database server 408. In some arrangements, the database server 108 is configured to transmit the second encrypted user data over a secure connection. Since the second encrypted user data is transmitted by the database server 408, the cleartext sensitive user data is not visible at the entrance or the exit of the secure connection.

The data decryption circuit 592 is configured to recover the cleartext sensitive user data by decrypting the second encrypted user data using the second named CEK 534. The data decryption circuit 592 is configured to display the cleartext sensitive user data via the output interface of the user input/output device 576. For example, the data decryption circuit 592 can display the sensitive user data on a window of a software application run on a browser of the data exit entity 416 or running locally on the data exit entity 416.

In arrangements in which the user of the data exit entity 416 requests multiple pieces of sensitive user data, the data decryption circuit 292 decrypts each piece of second encrypted user data and displays each piece of cleartext sensitive user data as described above.

Figure 6A:
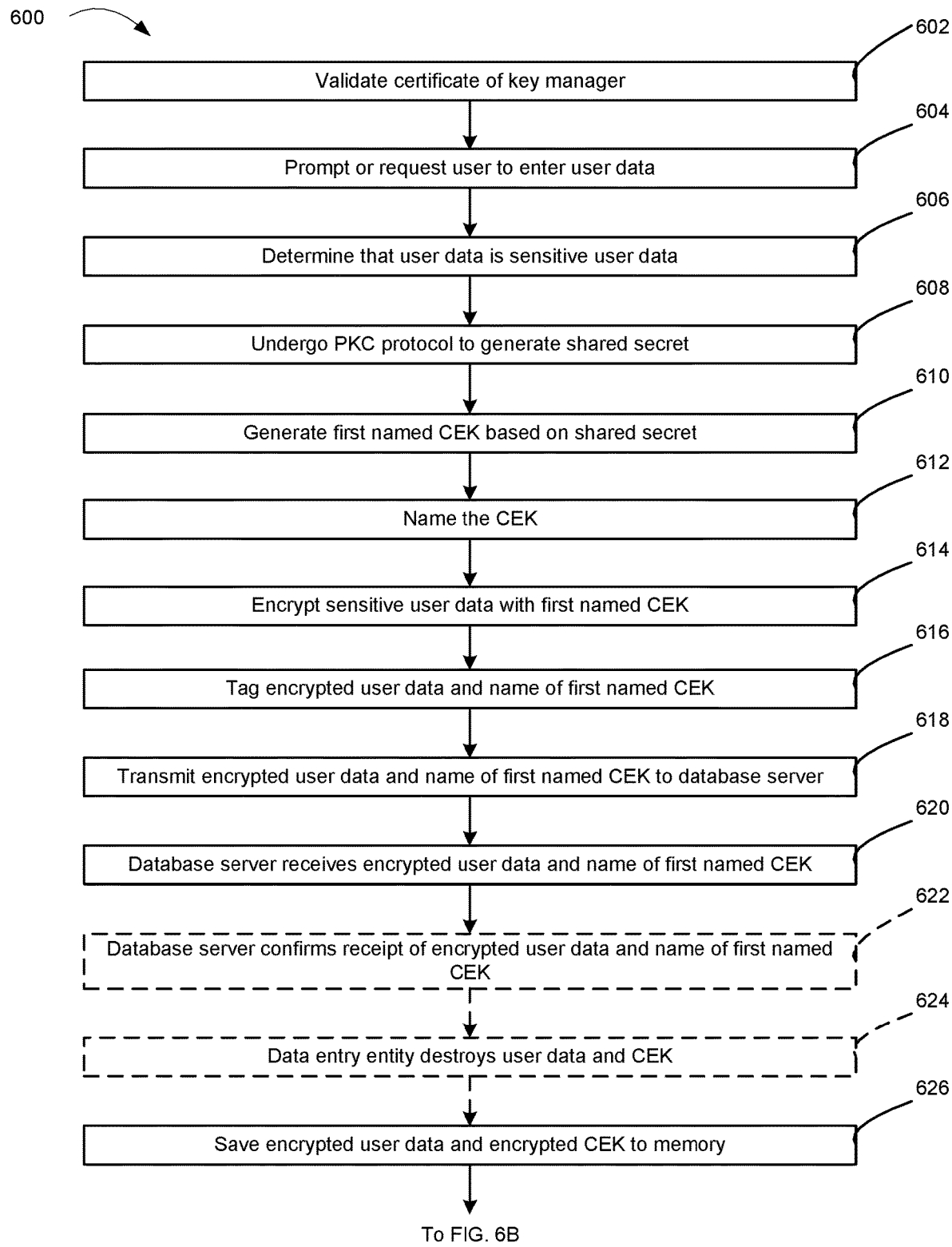
FIGS. 6A-6C are flow diagrams showing processes of protecting user data that is received by, stored on, and requested by one or more third-party computing systems, according to some arrangements.
Figure 6B:
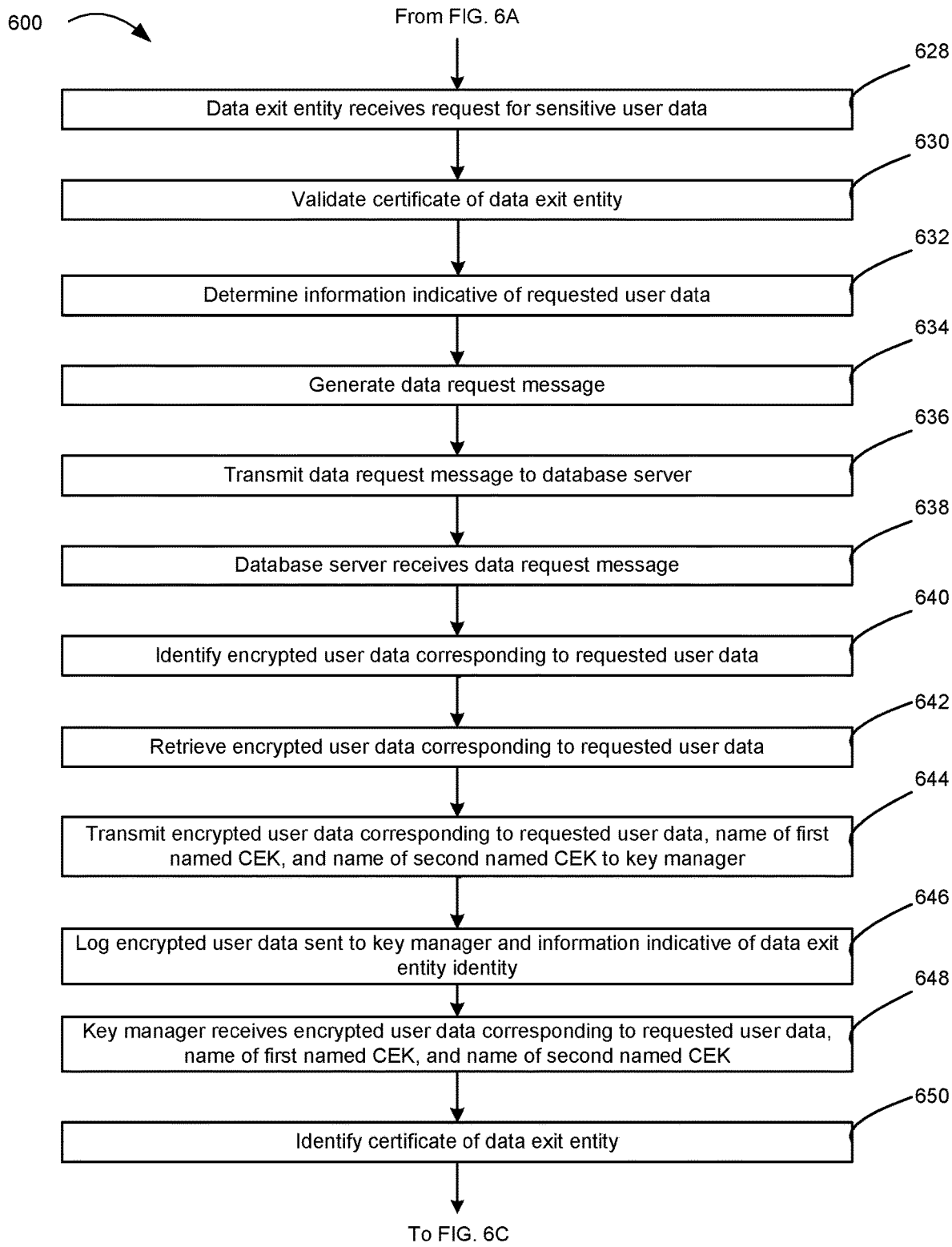
Figure 6C:
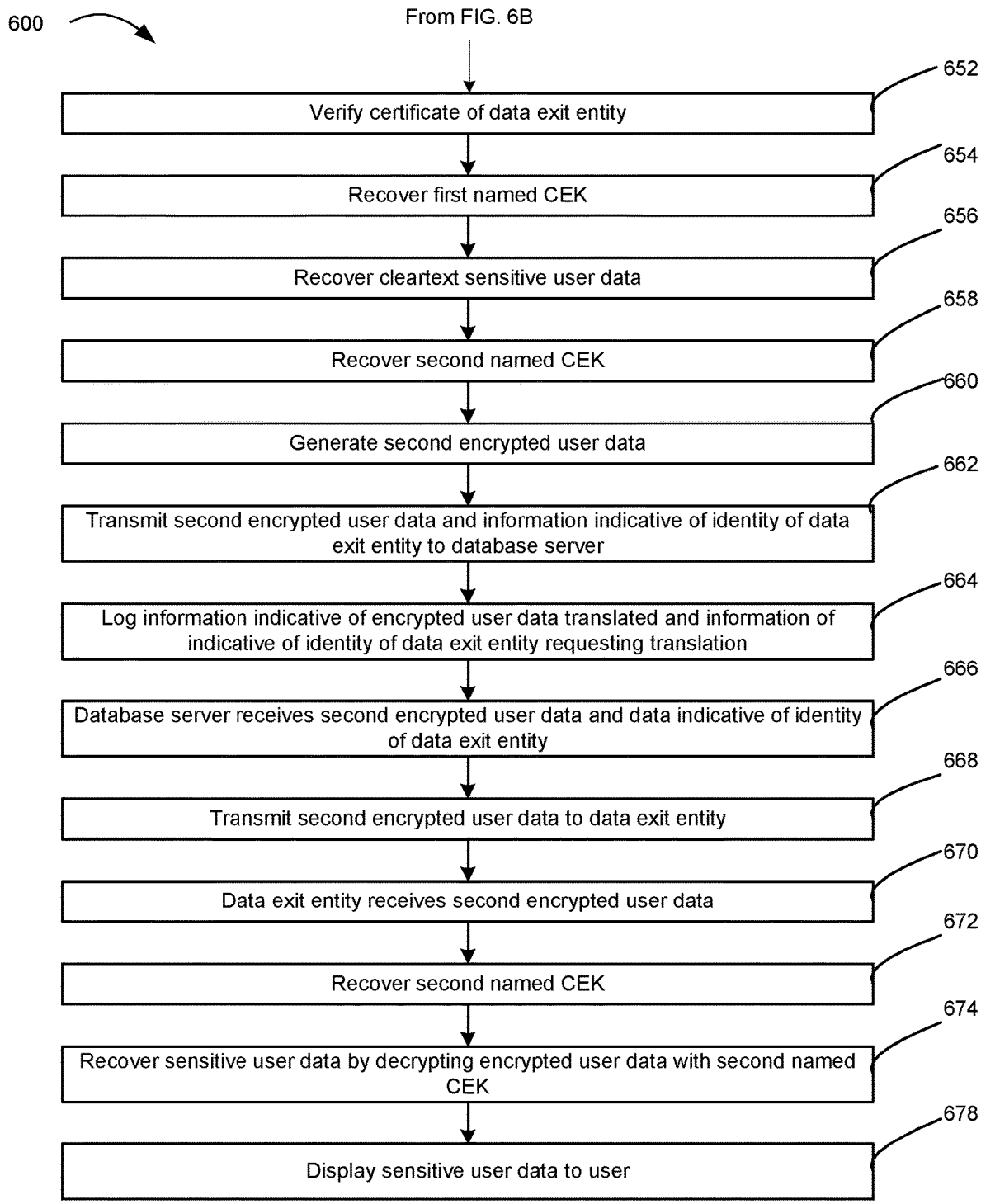

Referring now to FIGS. 6A-6B, a flow diagram of a method 600 for protecting sensitive user data that is received by a data entry entity, stored by a database server, and displayed by a data exit entity that may be administered by third parties is shown, according to an example arrangement. Blocks that are similar to blocks described with respect to FIGS. 3A-3C are not described in greater detail herein. At 602, the authentication circuit 524 validates the certificate of the key manager 412 similar to what is described in greater detail with respect to block 302 above. At 604, the data encryption circuit 520 prompts or requests the user to enter user data into the data entry entity 404 similar to what is described in greater detail with respect to block 304 above. At 606, the data encryption circuit 220 of the data entry entity 404 determines that the user data is sensitive user data similar to what is described in greater detail with respect to block 306 above.

At 608, the data encryption circuit 520 undergoes a PKC agreement protocol with the key manager 412. During the PKC agreement protocol, the data encryption circuit 520 and the key manager 412 exchange public keys and compute a shared secret 526. In some arrangements, the PKC agreement protocol can be a Diffie-Hellman protocol, an elliptic curve Diffie-Hellman protocol, another post-quantum cryptography protocol, etc. At 610, the data encryption circuit 520 derives a CEK from the shared secret 526. At 612, the data encryption circuit 520 or the key manager 412 generate a name for the CEK (e.g., the first named CEK 530) and transmits the name to the other of the data encryption circuit 520 and the key manager 412. The data encryption circuit 520 saves the first named CEK 530 to the memory 584 and the key manager 412 saves the first named CEK 530 to the memory 556.

At 614, the data encryption circuit 520 generates encrypted user data by encrypting the sensitive user data with the first named CEK 530. At 616, the data encryption circuit 220 tags the encrypted user data and the name of the first named CEK 530 with a tag that is readable by the database server 408. In some arrangements, the tag is a cleartext tag. The tag can include information indicative of the encrypted user data. For example, the information indicative of the encrypted user data can include information indicative of a type of user data corresponding to the encrypted user data and/or information indicative of an identity of a user corresponding to the encrypted user data. In some arrangements, the name of the first named CEK 530 is included in the tag. At 618, the data encryption circuit 520 transmits the encrypted user data and the name of the first named CEK 530 to the database server 408. In arrangements in which the data encryption circuit 520 determines that the data entry entity 404 has received multiple pieces of sensitive user data, the data encryption circuit 520 repeats blocks 610-618 for each piece of sensitive user data.

At 620, the database server 408 receives the encrypted user data and the name of the first named CEK 530 from the data entry entity 404 over the secure connection. At optional block 622, the database server 408 transmits a message to the data entry entity 404 indicating that the database server 408 has received the encrypted user data and the name of the first named CEK 530. At optional block 624, the data entry entity 404 destroys the cleartext sensitive user data in response to receiving a message from the database server 408 indicating that the database server 408 has received the encrypted user data and the name of the first named CEK 530. At 626, the database server 408 saves the encrypted user data and the name of the first named CEK 530 to the user information database 544 of the memory 536.

At 628, the message generation circuit 588 of the data exit entity 416 receives a request for sensitive user data input by a user using the user input/output device 576. At 630, the authentication circuit 596 of the data exit entity 416 validates the certificate of the data exit entity 416 as is described in greater detail with respect to block 328 above.

At 632, the message generation circuit 588 determines information indicative of the requested user data based on the request for sensitive user data input by the user of the data exit entity 416. The information indicative of the requested user data can include information indicative of a type of user data (e.g., social security number, account number, address, birth date, biometric, etc.) and/or information indicative of an identity of the user (e.g., a name, a reference number, etc.). At 634, the message generation circuit 588 generates a data request message including the information indicative of the requested user data, the name of the second named CEK 534, and/or information indicative of the identity of the data exit entity 416. The information indicative of the identity of the data exit entity 416 can include an IP address, an IMEI number, an instance of a software application running on the data exit entity 416 or a browser running on the data exit entity 416, etc. At 636, the message generation circuit 588 transmits the data request message to the database server 408 over a secure connection.

At 638, the data identification circuit 540 receives the data request message from the data exit entity 416. The data request message includes information indicative of the requested user data requested by the data exit entity 416 and the name of the second named CEK 534, and/or information indicative of the identity of the data exit entity 416. At 640, the data identification circuit 540 identifies the encrypted user data that corresponds to the requested user data based on the tag. For example, the data identification circuit 240 can compare the information indicative of the requested user data to the information indicative of the encrypted user data in the tag to identify the encrypted user data that matches the requested user data. The data identification circuit 540 never decrypts or reads the cleartext sensitive user data. At 642, the data identification circuit 540 retrieves the encrypted user data that matches the requested user data. At 644, the data identification circuit 540 transmits the encrypted user data, the name of the first named CEK 530 corresponding to the requested user data, and the name of the second named CEK 534 and/or the information indicative of the identity of the data exit entity 416 to the key manager 412. At 646, the data identification circuit 540 logs each piece of encrypted user data sent to the key manager 412 and the information indicative of the data exit entity 416 requesting the encrypted user data sent to the key manager 412. In some arrangements, the data request message can include one or more pieces of requested user data. In such arrangements, data identification circuit 540 repeats blocks 632-646 for each piece of requested user data. As described herein, the database server 408 excludes the shared secret 526, the first named CEKs 530, and the second named CEKs 534. Therefore, the database server 408 cannot decrypt the encrypted user data to recover the cleartext sensitive user data.

At 648, the translation circuit 560 of the key manager 412 receives the encrypted user data corresponding to the requested user data, the name of the first named CEK 530, the name of the second named CEK 534 and/or the information indicative of the identity of the data exit entity 416. At 650, the translation circuit 560 identifies the certificate for the data exit entity 416 based on the information indicative of the identity of the data exit entity 416. At 652, the authentication circuit 564 validates the certificate of the data exit entity 416 similar to what is described in greater detail above with respect to block 350. In response to determining that the data exit entity certificate is valid, the authentication circuit 264 allows translation of the encrypted user data. In response to determining that the data exit entity certificate is invalid, the authentication circuit 264 prevents translation of the encrypted user data.

At 654, the translation circuit 560 recovers the first named CEK 530 based on the name of the first named CEK 530 and the shared secret 526 established between the data entry entity 404 and the key manager 412. At 656, the translation circuit 560 recovers the cleartext sensitive user data by decrypting the encrypted user data with the first named CEK 530. At 658, the translation circuit 560 recovers the second named CEK 534 based on the name of the second named CEK 534 and the shared secret 542 established between the data exit entity 416 and the key manager 412. At 660, the translation circuit generates second encrypted user data by encrypting the cleartext sensitive user data with the second named CEK 534. At 662, the translation circuit 260 transmits the second encrypted user data and the information indicative of the identity of the data exit entity 416 to the database server 408. At 662, the translation circuit 560 logs information indicative of each piece of encrypted user data that has been translated and the information indicative of the identity of each data exit entity 416 requesting translation of each piece of encrypted user data in the data translation log 572.

At 666, the data identification circuit 540 of the database server 408 receives the second encrypted user data and the information indicative of the identity of the data exit entity 416. At 668, the data identification circuit 540 transmits the encrypted user data to the data exit entity 416 over a secure connection.

At 670, the data decryption circuit 592 of the data exit entity 416 receives the second encrypted user data from the database server 408 over the secure connection. Since the second encrypted user data is encrypted, the cleartext sensitive user data is not visible at the entrance and the exit ends of the secure connection. At 672, the data decryption circuit 592 recovers the second named CEK 534 based on the name of the second CEK 534 and the shared secret 542. At 674, the data decryption circuit 592 recovers the cleartext sensitive user data by decrypting the second encrypted user data with the second named CEK 534. At 672, the data decryption circuit 592 displays the cleartext sensitive user data to the user of the data exit entity 416. For example, the data decryption circuit 592 can display the cleartext sensitive user data on a window of a software application run on a browser of the data exit entity 416 or running locally on the data exit entity 416.

In some arrangements, the user may request more than one piece of sensitive user data. In such an arrangement, the data request message includes all of the pieces of requested user data. The data exit entity 416 repeats blocks 668-672 for each piece of requested data. In some arrangements, the user may request that one or more pieces of sensitive user data are shared with more than one data exit entity 416. In such an arrangement, the data request message includes all of the pieces of requested user data and information indicative of the identities of the data exit entities 416 to which each piece of sensitive user data should be sent. Each of the data exit entities 416 then completes blocks 668-672 for each piece of encrypted user data received.

Although the systems 100 and 400 are described separately, some arrangements may combine features of each system. For example, a system may include one or more data entry entities 104 that encrypt sensitive user data with a CEK and send the encrypted user data and the encrypted CEK to a database server described above with respect to the data entry entity 104. This system may include one or more data exit entities 416 that decrypt and display sensitive user data using a named CEK that is based on a shared secret established with the key manager via a PKC protocol as described above with respect to the system 400. The database server and the key manager of this arrangement combine features of the database servers 108, 408 and the key managers 112, 412, respectively, as described in greater detail below. In such an arrangement, in response to determining that the encrypted user data has been encrypted by a CEK and that the data message request includes a name of a second named CEK, the data identification circuit of the database server is configured to send both the encrypted user data and the encrypted CEK to the key manager as described above with respect to the database server 108. In such arrangements, the key manager is configured to operate as described above with respect to the key manager 112 when decrypting the encrypted CEK. However, the translation circuit of the key manager is further configured to decrypt the encrypted user data to recover the cleartext sensitive user data. The key manager is then configured to recover the second named CEK based on the name of the second CEK sent in the data request message as described above with respect to the key manager 412. The key manager is configured to encrypt the cleartext sensitive user data with the second named CEK as described above with respect to the key manager 412 to generate the second encrypted user data that the data exit entity 416 can decrypt. The key manager is configured to send the second encrypted user data to the database server as described above with respect to the key manager 412.

In another example, a system may include one or more data entry entities 404 as described above with respect to the system 400. The one or more data entry entities 404 generate a shared secret with the key manager via a PKC protocol and then derive a named CEK from the shared secret as described above with respect to the system 400. The one or more data entry entities 404 then encrypt each piece of sensitive user data using the named CEK. This system may include one or more data exit entities 116 that receive second encrypted data that has been encrypted with a CEK that has been encrypted with the private key of each of the one or more data exit entities 116. The database server and the key manager of this arrangement combine features of the database servers 108, 408 and the key managers 112, 412, respectively, as described in greater detail below. In such an arrangement, the data identification circuit of the database server receives the data request message, retrieves the encrypted user data corresponding to the requested user data based on the tag, and sends the encrypted user data, the name of the first named CEK, and the information indicative of the identity of the data exit entity 116 as described with respect to the database server 408. The key manager is configured to recover the first named CEK based on the shared secret previously established between the key manager 412 and the data entry entity 404 as described above with respect to the system 400. In response to determining, based on the information indicative of the identity of the data exit entity 116, that the key database includes a public key corresponding to the data exit entity 116, the key manager is configured to generate a CEK as described above with respect to the data entry entity 104. The key manager is configured to encrypt the cleartext sensitive user data with the CEK as described above with respect to the data entry entity 104 to generate second encrypted user data. The key manager is configured to encrypt the CEK with the public key 261 of the data exit entity 116 as described above with respect to the key manager 112. The key manager is then configured to send the second encrypted user data and the encrypted CEK to the database server or send the second encrypted user data and the encrypted CEK to the data exit entity 116. The data exit entity 116 can decrypt the encrypted CEK using its private key to recover the cleartext CEK and decrypt the second encrypted user data using the cleartext CEK as described above.

In some arrangements, the data entry entity includes the functionality of the data entry entity 104 as described above with respect to the system 100 and the functionality of the data entry entity 404 as described above with respect to the system 400. Such a data entry entity can communicate with database servers 108 as described with respect to the system 100 and database servers 408 as described with respect to the system 400. In such an arrangement, when used with the database server 108 and the key manager 112, the database server 108 may send a message instructing the data entry entity to use the protocol of system 100. When used with the database server 408 and the key manager 412, the database server 408 may send a message instructing the data entry entity to use the protocol of system 400.

In some arrangements, the data exit entity includes the functionality of the data exit entity 116 as described above with respect to the system 100 and the functionality of the data exit entity 416 as described above with respect to the system 400. Such a data exit entity can communicate with database servers 108 as described with respect to the system 100 and database servers 408 as described with respect to the system 400. In such an arrangement, when used with the database server 108 and the key manager 112, the database server 108 may send a message instructing the data exit entity to use the protocol of system 100. When used with the database server 408 and the key manager 412, the database server 408 may send a message instructing the data exit entity to use the protocol of system 400.

In some arrangements, the system 100 and/or the system 400 can be used to manage sensitive user data involved in real estate transactions. In such an arrangement, the data entry entity 104, 404 can include computing devices operated by real estate attorneys, bank employees, property appraisers, real estate agents, etc. The sensitive user data can include information such as a home owner and/or prospective home buyer's name, social security number, address, credit score, income, etc. The operators of the data entry entities 104, 404 have been authorized by an entity such as a bank providing a mortgage for the transaction. After authorization, the bank can send the key manager certificate to the data entry entity 104, 404 operated by the authorized operator. The operator of the data entry entity 104, 404 can input this sensitive user data into a software program run on a browser of the data entry entity 104, 404. The software program can identify the data entered by the operator of the data entry entity 104, 404 as sensitive user data, encrypt the sensitive user data as described above with respect to the data entry entities 104, 404, and send the encrypted user data to the database server 108, 408. In such an arrangement, the database server 108, 408 can be a cloud-based database stored in a cloud network. The database server 108, 408 can be operated by a third party (e.g., the database server is not managed by the data owner or the data receiver). As described above with respect to the systems 100, 400, the database server 108, 408 cannot decrypt the encrypted user data. The key manager 112, 412 may be administered by the bank providing the mortgage.

In such an arrangement, the data exit entity 116, 416 can include computing devices operated by real estate attorneys, bank employees, property appraisers, real estate agents, etc. that need to gain access to the sensitive user data. The operators of the data exit entities 116, 416 have been authorized by an entity such as a bank providing a mortgage for the transaction. After authorization, the bank can send the key manager certificate to the data exit entity 116, 416 operated by the authorized operator and the data exit entity 116, 416 can send its certificate to the key manager 112, 412. The operator of the data exit entity 116, 416 can input information indicative of requested user data into a software program run on a browser of the data exit entity 116, 416. The data exit entity 116, 416, can generate a data request message based on the information indicative of the requested user data and send the data request message to the database server 108, 408. In some arrangements, the data exit entity 116 can receive second encrypted user data and an encrypted CEK encrypted with the public key 261 of the data exit entity 116. The data exit entity 116 can decrypt the encrypted CEK using its private key to generate the cleartext CEK, decrypt the second encrypted user data with the cleartext CEK to recover the cleartext data, and display the cleartext sensitive user data to the operator of the data exit entity 116 as described above with respect to the data exit entity 116. In other arrangements, the data exit entity 416 can receive second encrypted user data encrypted with the second named CEK. The data exit entity 416 can recover the second named CEK based on the shared secret generated between the key manager 412 and the data exit entity 416 and the name of the second named CEK. The data exit entity 416 can decrypt the second encrypted user data using the second named CEK to recover the cleartext sensitive user data, and display the cleartext sensitive user data to the operator of the data exit entity 416 as described above with respect to the data exit entity 416.

In some arrangements, the system 100 and/or the system 400 can be used to manage sensitive user data involved in healthcare. In such an arrangement, the data entry entity 104, 404 can include computing devices operated by healthcare professionals such as doctors, nurses, nursing assistants, etc. The sensitive user data can include information such as a patient's name, social security number, test results, medical history information, etc. The operators of the data entry entities 104, 404 have been authorized by an entity such as the patient's insurance company or a healthcare provider network. After authorization, the insurance company or the healthcare system can send the key manager certificate to the data entry entity 104, 404 operated by the authorized operator. The operator of the data entry entity 104, 404 can input this sensitive user data into a software program run on a browser of the data entry entity 104, 404. The software program can identify the data entered by the operator of the data entry entity 104, 404 as sensitive user data, encrypt the sensitive user data as described above with respect to the data entry entities 104, 404, and send the encrypted user data to the database server 108, 408. In such an arrangement, the database server 108, 408 can be a cloud-based database stored in a cloud network. The database server 108, 408 can be operated by a third party (e.g., the database server is not managed by the data owner or the data receiver). As described above with respect to the systems 100, 400, the database server 108, 408 cannot decrypt the encrypted user data. The key manager 112, 412 may be administered by the insurance company or the healthcare provider network.

In such an arrangement, the data exit entity 116, 416 can include computing devices operated by insurance company employees or employees of the healthcare network different than the employees that operate the data entry entity 104, 404 that need to gain access to the sensitive user data. The operators of the data exit entities 116, 416 have been authorized by an entity such as the insurance company or the healthcare network. After authorization, the insurance company or healthcare network can send the key manager certificate to the data exit entity 116, 416 operated by the authorized operator and the data exit entity 116, 416 can send its certificate to the key manager 112, 412. The operator of the data exit entity 116, 416 can input information indicative of requested user data into a software program run on a browser of the data exit entity 116, 416. The data exit entity 116, 416, can generate a data request message based on the information indicative of the requested user data and send the data request message to the database server 108, 408. In some arrangements, the data exit entity 116 can receive second encrypted user data and an encrypted CEK encrypted with the private key of the data exit entity 116. The data exit entity 116 can decrypt the encrypted CEK using its private key to generate the cleartext CEK, decrypt the second encrypted user data with the cleartext CEK to recover the cleartext sensitive user data, and display the cleartext sensitive user data to the operator of the data exit entity 116 as described above with respect to the data exit entity 116. The operator of the data exit entity 116 can use the displayed sensitive user data to process insurance claims, review a patient's health history, etc. In other arrangements, the data exit entity 416 can receive second encrypted user data encrypted with the second named CEK. The data exit entity 416 can recover the second named CEK based on the shared secret generated between the key manager 412 and the data exit entity 416 and the name of the second named CEK. The data exit entity 416 can decrypt the second encrypted user data using the second named CEK to recover the cleartext sensitive user data, and display the cleartext sensitive user data to the operator of the data exit entity 416 as described above with respect to the data exit entity 416.

The operator of the data exit entity 416 can use the displayed sensitive user data to process insurance claims, review a patient's health history, etc.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be configured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components configured to or execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method blocks, it is understood that the order of these blocks may differ from what is depicted. For example, two or more blocks may be performed concurrently or with partial concurrence. Also, some method blocks that are performed as discrete blocks may be combined, blocks being performed as a combined block may be separated into discrete blocks, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching blocks, correlation blocks, comparison blocks and decision blocks.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A data entry computing system on a first network node, the data entry computing system comprising a processing circuit configured to:
   identify user-entered data as sensitive user data;
   generate a content encryption key (CEK);
   generate encrypted user data by encrypting the sensitive user data with the CEK;
   tag the encrypted user data and the CEK with a tag readable by a database server on a network node different than the data entry computing system, the tag comprising information indicative of the encrypted user data;
   transmit the encrypted user data to the database server, wherein the database server excludes a private key of a key manager on a network node different than the data entry computing system;
   generate an encrypted CEK by encrypting the CEK with a public key of the key manager;
   tag the encrypted CEK with the tag readable by the database server; and
   transmit the encrypted CEK to the database server with the encrypted user data, wherein the key manager excludes the encrypted user data, wherein the database server is configured to transmit the encrypted CEK to the key manager in response to receiving a request for the sensitive user data from a data exit computing system comprising a public/private key pair on a different network node than the data entry computing system, identify the requested user data, based on a predefined time period, or in response to receiving instructions from the data entry computing system to send the sensitive user data to the data exit computing system, and wherein the key manager is configured to decrypt the CEK using the private key of the key manager and encrypt the CEK using a public key of the data exit computing system.

2. The data entry computing system of claim 1, wherein the data entry computing system comprises an application configured to run in a web browser.

3. The data entry computing system of claim 1, wherein the tag comprises information indicative of a type of the encrypted user data and an identity of a user corresponding to the encrypted user data.

4. The data entry computing system of claim 1, wherein the CEK is a symmetric key.

5. The data entry computing system of claim 1, wherein the processing circuit is further configured to generate a CMS SignedData message wrapper around the encrypted user data and the encrypted CEK.

6. The data entry computing system of claim 1, wherein the processing circuit is further configured to generate a CMS SigncryptedData message wrapper around the encrypted user data and the encrypted CEK.

7. The data entry computing system of claim 1, wherein the user-entered data is first user-entered data, the user data is first user data, the CEK is a first CEK, and the tag is a first tag, and wherein the instructions further cause the processor to:
   identify second user-entered data as second sensitive user data, the second user-entered data different than the first user-entered data;
   generate a second CEK different than the first CEK;
   generate encrypted second user data by encrypting the second sensitive user data with the second CEK;
   generate an encrypted second CEK by encrypting the second CEK with the public key of the key manager; and
   tag the encrypted second user data and the encrypted second CEK with a second tag readable by a database server, the second tag comprising information indicative of the encrypted second user data; and
   transmit the encrypted second user data and the encrypted second CEK to the database server, wherein the key manager excludes the encrypted second user data.

8. The data entry computing system of claim 1, wherein the processing circuit is further configured to generate a key encryption key (KEK) and encrypt the CEK with the KEK.

9. The data entry computing system of claim 1, wherein the processing circuit is further configured to:
   undergo a public key cryptography (PKC) agreement protocol with the key manager to generate a shared secret between the data entry computing system and the key manager;
   derive the CEK from the shared secret;
   generate a name of the CEK; and
   transmit the name of the CEK to the database server with the encrypted user data.

10. The data entry computing system of claim 9, wherein the PKC protocol includes a Diffie-Hellman protocol, an elliptic curve Diffie-Hellman protocol, or another post-quantum cryptography protocol.

11. The data entry computing system of claim 9, wherein the processing circuit is further configured to generate a CMS SigncryptedData message wrapper around the encrypted user data and the name of the CEK.

12. The data entry computing system of claim 9, wherein the database server is configured to identify requested user data and the name of the first named CEK, and transmit the encrypted user data corresponding to the requested user data, the name of the first named CEK, and the name of the second named CEK to the key manager in response to receiving a request for the sensitive user data from the data exit computing system comprising the different network node than the data entry computing system and a second CEK having a second name, based on the predefined time period, or in response to receiving the instructions from the data entry computing system to send the sensitive user data to the data exit computing system, and wherein the key manager is configured to recover the sensitive user data by decrypting the encrypted user data using the first named CEK and generate second encrypted user data by encrypting the sensitive user data using the second named CEK.

13. A method, performed by a data entry computing system on a first network node, comprising:
identifying user-entered data as sensitive user data;
generating a content encryption key (CEK);
generating encrypted user data by encrypting the sensitive user data with the CEK;
tagging the encrypted user data and the CEK with a tag readable by a database server on a network node different than the data entry computing system, the tag comprising information indicative of the encrypted user data;
transmitting the encrypted user data to the database server, wherein the database server excludes a private key of a key manager on a network node different than the data entry computing system;
generating an encrypted CEK by encrypting the CEK with a public key of the key manager;
tagging the encrypted CEK with the tag readable by the database server; and
transmitting the encrypted CEK to the database server with the encrypted user data, wherein the key manager excludes the encrypted user data, wherein the database server is configured to transmit the encrypted CEK to the key manager in response to receiving a request for the sensitive user data from a data exit computing system comprising a public/private key pair on a different network node than the data entry computing system, identify the requested user data, based on a predefined time period, or in response to receiving instructions from the data entry computing system to send the sensitive user data to the data exit computing system, and wherein the key manager is configured to decrypt the CEK using a private key of the key manager and encrypt the CEK using a public key of the data exit computing system.

14. The method of claim 13, wherein the data entry computing system comprises an application configured to run in a web browser.

15. The method of claim 13, wherein the tag comprises information indicative of a type of the encrypted user data and an identity of a user corresponding to the encrypted user data.

16. At least one non-transitory computer-readable medium comprising computer-readable instructions such that, when executed, causes at least one processor to:
identify user-entered data as sensitive user data;
generate a content encryption key (CEK);
generate encrypted user data by encrypting the sensitive user data with the CEK;
tag the encrypted user data and the CEK with a tag readable by a database server on a network node different than a data entry computing system, the tag comprising information indicative of the encrypted user data;
transmit the encrypted user data to the database server, wherein the database server excludes a private key of a key manager on a network node different than the data entry computing system;
generate an encrypted CEK by encrypting the CEK with a public key of the key manager;
tag the encrypted CEK with the tag readable by the database server; and
transmit the encrypted CEK to the database server with the encrypted user data, wherein the key manager excludes the encrypted user data, wherein the database server is configured to transmit the encrypted CEK to the key manager in response to receiving a request for the sensitive user data from a data exit computing system comprising a public/private key pair on a different network node than the data entry computing system, identify the requested user data, based on a predefined time period, or in response to receiving instructions from the data entry computing system to send the sensitive user data to the data exit computing system, and wherein the key manager is configured to decrypt the CEK using a private key of the key manager and encrypt the CEK using a public key of the data exit computing system.

17. The method of claim 16, wherein the data entry computing system comprises an application configured to run in a web browser.

18. The method of claim 16, wherein the tag comprises information indicative of a type of the encrypted user data and an identity of a user corresponding to the encrypted user data.

* * * * *